US012725585B1

(12) United States Patent
Chen et al.

(10) Patent No.: US 12,725,585 B1
(45) Date of Patent: Sep. 1, 2026

(54) MULTISTABLE DISPLAY DRIVEN BY STATIC DISPLAY SWITCH

(71) Applicant: GENETOUCH CORP., Taoyuan City (TW)

(72) Inventors: Cheng Yu Chen, Taoyuan City (TW); Ching Lung Li, Taoyuan City (TW); Chi Lee, Taoyuan City (TW)

(73) Assignee: GENETOUCH CORP., Taoyuan City (TW)

( * ) Notice: Subject to any disclaimer, the term of this patent is extended or adjusted under 35 U.S.C. 154(b) by 0 days.

(21) Appl. No.: 19/210,674

(22) Filed: May 16, 2025

(30) Foreign Application Priority Data

Apr. 1, 2025 (TW) ................................ 114112626

(51) Int. Cl.
*G09G 3/36* (2006.01)

(52) U.S. Cl.
CPC ....... *G09G 3/3651* (2013.01); *G09G 2310/06* (2013.01); *G09G 2310/08* (2013.01); *G09G 2330/021* (2013.01)

(58) Field of Classification Search
None
See application file for complete search history.

(56) References Cited

U.S. PATENT DOCUMENTS 7,769,035 B1 * 8/2010 Breau ..................... H04L 47/10 370/392
12,217,716 B1 * 2/2025 Tseng ................... G09G 3/3629
2011/0080418 A1 * 4/2011 Rhodes .................. G09G 5/393 345/545
2011/0310980 A1 * 12/2011 Mathew ............... H04N 19/593 375/E7.076
2015/0213751 A1 * 7/2015 Lee ...................... G09G 3/2085 345/212
2016/0239062 A1 * 8/2016 Lee .................... H04N 21/4383
2023/0185121 A1 * 6/2023 Lin ..................... G02F 1/13718 349/33

* cited by examiner

*Primary Examiner* — Donna V Bocar
(74) *Attorney, Agent, or Firm* — RABIN & BERDO, P.C.

(57) ABSTRACT

A multistable display driven by static display switch includes a time controller circuit, a driver circuit, and a screen. The time controller circuit generates a time controller signal, and a data signal included in the time controller signal further includes a pixel static display header data and a pixel static display waveform data. The driver circuit determines a pixel display voltage value of a pixel display driver signal according to the pixel static display header data. The driver circuit also determines a pixel display driving time duration according to the pixel static display waveform data, and the driver circuit outputs the pixel display driver signal with the pixel display voltage value to the screen for the pixel display driving time duration. The multistable display may be driven at a low clock rate to decrease power consumption.

10 Claims, 23 Drawing Sheets

MULTISTABLE DISPLAY DRIVEN BY STATIC DISPLAY SWITCH

CROSS-REFERENCE TO RELATED APPLICATION(S)

This application claims the priority benefit of TW application serial No. 114112626 filed on Apr. 1, 2025, the entirety of which is hereby incorporated by reference herein and made a part of the specification.

BACKGROUND OF THE INVENTION

1. Field of the Invention

The present invention relates to a display, more particularly a multistable display driven by static display switch (CDS) with a low clock rate.

2. Description of the Related Art

A conventional multistable display, such as a cholesteric liquid crystal display (ChLCD), has liquid crystals with bistable displaying properties. As such, various sets of different voltages are required to drive the conventional multistable display for displaying a frame. For example, the conventional multistable display includes a screen, and each pixel on the screen is intersected by a plurality of line electrodes and a plurality of pixel electrodes Furthermore, in the screen, a liquid crystal layer is mounted between the line electrodes and the pixel electrodes. When driving the screen, voltages are applied to the line electrodes and the pixel electrodes, thus configuring a location corresponding to a pixel to have a specific voltage difference across the liquid crystal layer, and allowing the liquid crystal within the liquid crystal layer to correspondingly rotate to a specific angle.

As various sets of different voltages are required to drive the conventional multistable display, a control signal of the conventional multistable display, however, requires a plurality of bits to transport control data that dictates the various sets of different voltages required for each of the pixels. In other words, the control signal of the conventional multistable display cannot simply use one single bit to represent the various sets of different voltages required for each of the pixels. For example, conventionally, the control data used for dictating the various sets of different voltages required for each of the pixels is transported in 3 bits. This means that, each time the various sets of different voltages required for one pixel are modified, 3 bits of the control data need to be transported.

The conventional multistable display further includes a time controller circuit (TCON) and a driver circuit (driver IC). The time controller circuit is configured to generate a time controller signal to the driver circuit. The driver circuit is configured to generate pixel driving signals to the line electrodes and the pixel electrodes according to the time controller signal, thus driving the conventional multistable display to display a frame.

The time controller circuit, conventionally, includes a clock signal output port (clk), a display output enable control port (doe), a display output ground control port (dog), a digital to analog control port (d2a), a display start pulse control port (dsp), and a plurality of data output ports (data). The clock signal output port (clk), the display output enable control port (doe), the display output ground control port (dog), the digital to analog control port (d2a), the display start pulse control port (dsp), and the data output ports (data) are connected to the driver circuit (driver IC) for transporting the control signal. Particularly, a frequency of a clock signal outputted from the clock signal output port (clk) greatly affects an overall power consumption of the conventional multistable display, i.e. the higher the frequency of the clock signal, the greater the overall power consumption of the conventional multistable display would be.

For example, for the conventional multistable display with Full HD resolution of 1920×1080, when using single data rate (SDR) for transporting the control signal, each cycle of the clock signal is able to include and transport control data for 2 pixels, and thus in other words, the pixel per clock is 2. Furthermore, a transportation time ($T_{line}$) is configured to be 5 milliseconds (ms). The control data corresponding to each of the pixels is transported in 3 bits. Overall, as the control data corresponding to each of the pixels requires 3 bits transportation, and as the pixel per clock is 2, a number of the data output ports (data) equals a number of bits required for each pixel multiplied by a number of pixels per clock, hence 3×2=6, in other words, the number of the data output ports (data) is 6.

Moreover, for each of the pixels, within a frame, various sets of different voltages are still required to modify voltage waveforms used for driving the liquid crystals. For example, a plurality of duties is required to display a frame, and a number of duties required to display the frame is a duty count. The duty count may be modified as desired, for example, configured to be 64. The duty count is usually configured in different powers of 2. Whenever each duty requires different sets of voltages for driving, 3 bits of control data need to be sent for each duty, hence, for an abundance of duty counts, an abundance of bits would need to be sent for each frame.

The frequency of the clock signal, or a clock rate of the conventional multistable display may be calculated with the following formula:

$$\text{clock rate (Hz)} = \left[\frac{\text{(resolution)}}{\text{(piexl per lock)}} + \text{(hold time)}\right] \times \frac{\text{(duty count)}}{(T_{line})}$$

More particularly, when the resolution is 1920, the pixel per clock under SDR is 2, the hold time is configured as 1, the duty count is configured as 64, the transportation time ($T_{line}$) is configured as 5 ms, and the clock rate is obtained as shown in the following Table 1:

TABLE 1

| Resolution | Mode | Pixel per clock | Duty count | $T_{line}$ | Clock rate |
|---|---|---|---|---|---|
| Full HD (1920 × 1080) | SDR | 2 | 64 | 5 (ms) | 12.314 (MHz) |

As described earlier and in Table 1, when under Full HD resolution, the clock rate and the duty count are correlated. By having high clock rates, the conventional multistable display consumes a great amount of power; hence, the conventional multistable display consumes too much power with its high clock rates.

SUMMARY OF THE INVENTION

As most conventional multistable displays consume too much power with high clock rates, the present invention provides a multistable display driven by static display switch (CDS) with a lower clock rate. As a result, the multistable display driven by CDS of the present invention is able to decrease power consumption.

The multistable display driven by CDS includes a time controller circuit (TCON), a driver circuit (Driver IC), and a screen (Panel).

The time controller circuit generates a time controller signal. The driver circuit is connected to the time controller circuit, and the driver circuit receives the time controller signal. The screen is connected to the driver circuit.

The time controller signal includes a data signal, and the data signal includes a pixel static display header data and a pixel static display waveform data. The driver circuit determines a pixel display voltage value of a pixel display driver signal according to the pixel static display header data. The driver circuit determines a pixel display driving time duration according to the pixel static display waveform data, and the driver circuit outputs the pixel display driver signal with the pixel display voltage value to the screen for the pixel display driving time duration.

As the driver circuit determines the pixel display voltage value of the pixel display driver signal according to the pixel static display header data, and as the driver circuit determines the pixel display driving time duration for outputting the pixel display driver signal with the pixel display voltage value to the screen according to the pixel static display waveform data, the driver circuit is able to configure an entire waveform of the pixel display driver signal for each pixel electrode merely according to the pixel static display header data and the pixel static display waveform data. In other words, the driver circuit avoids needing to re-supply new voltage values for configuring a voltage waveform when adjusting the voltage waveform for driving the screen. As such, a clock rate and a duty count for driving the screen are no longer correlated for the present invention. The present invention may therefore drastically decrease an amount of bits needed to transport and drive the screen. In comparison to a conventional multistable display, under a same condition of transporting a same amount of bits within a same time frame, the present invention is able to drive the screen with a lower clock rate, thus decreasing a power consumption needed for driving the screen.

DETAILED DESCRIPTION OF THE INVENTION

Figure 1:
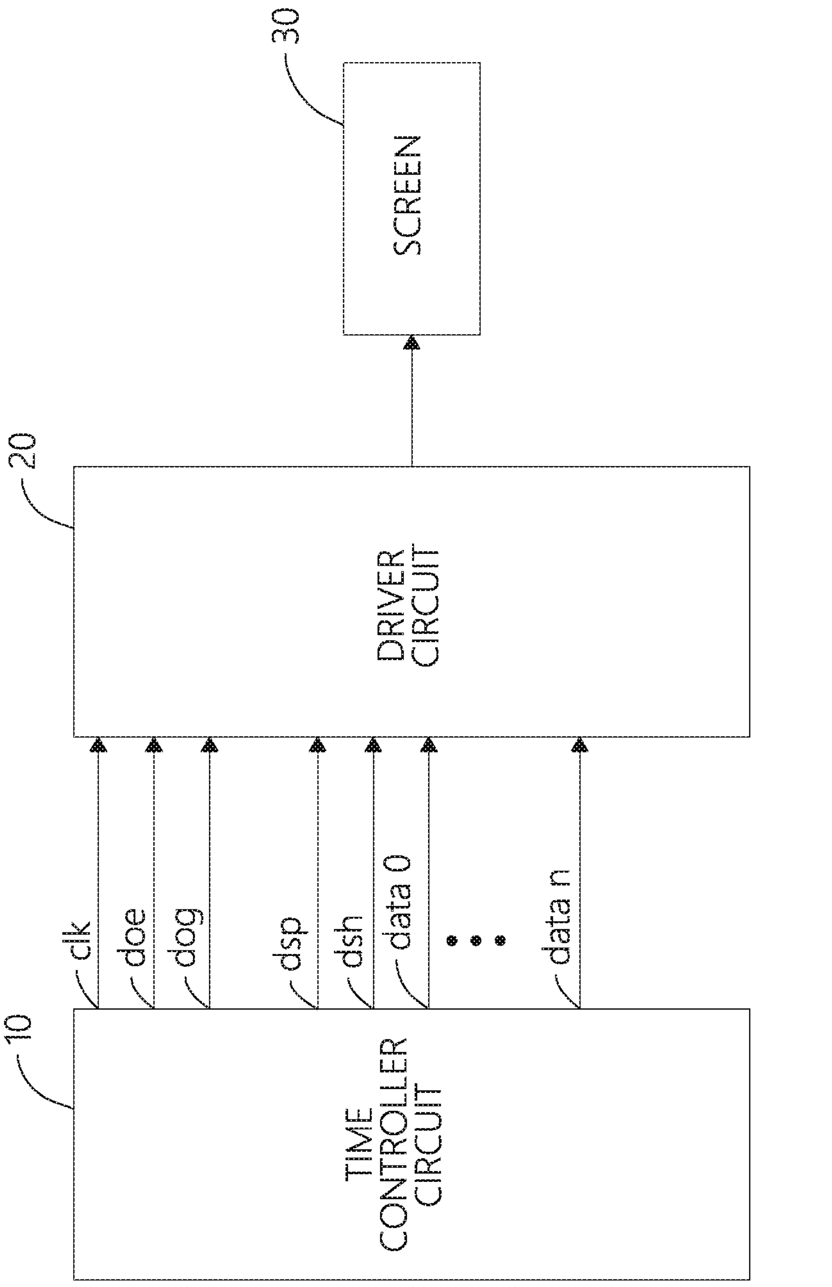
FIG. 1 is a block diagram of a multistable display driven by static display switch (CDS) of the present invention.

With reference to FIG. 1, a multistable display driven by static display switch (CDS) includes a time controller circuit 10, a driver circuit 20, and a screen 30.

The time controller circuit 10 generates a time controller signal. The driver circuit 20 is connected to the time controller circuit 10, and the driver circuit 20 receives the time controller signal. The screen 30 is connected to the driver circuit 20.

Figure 2:
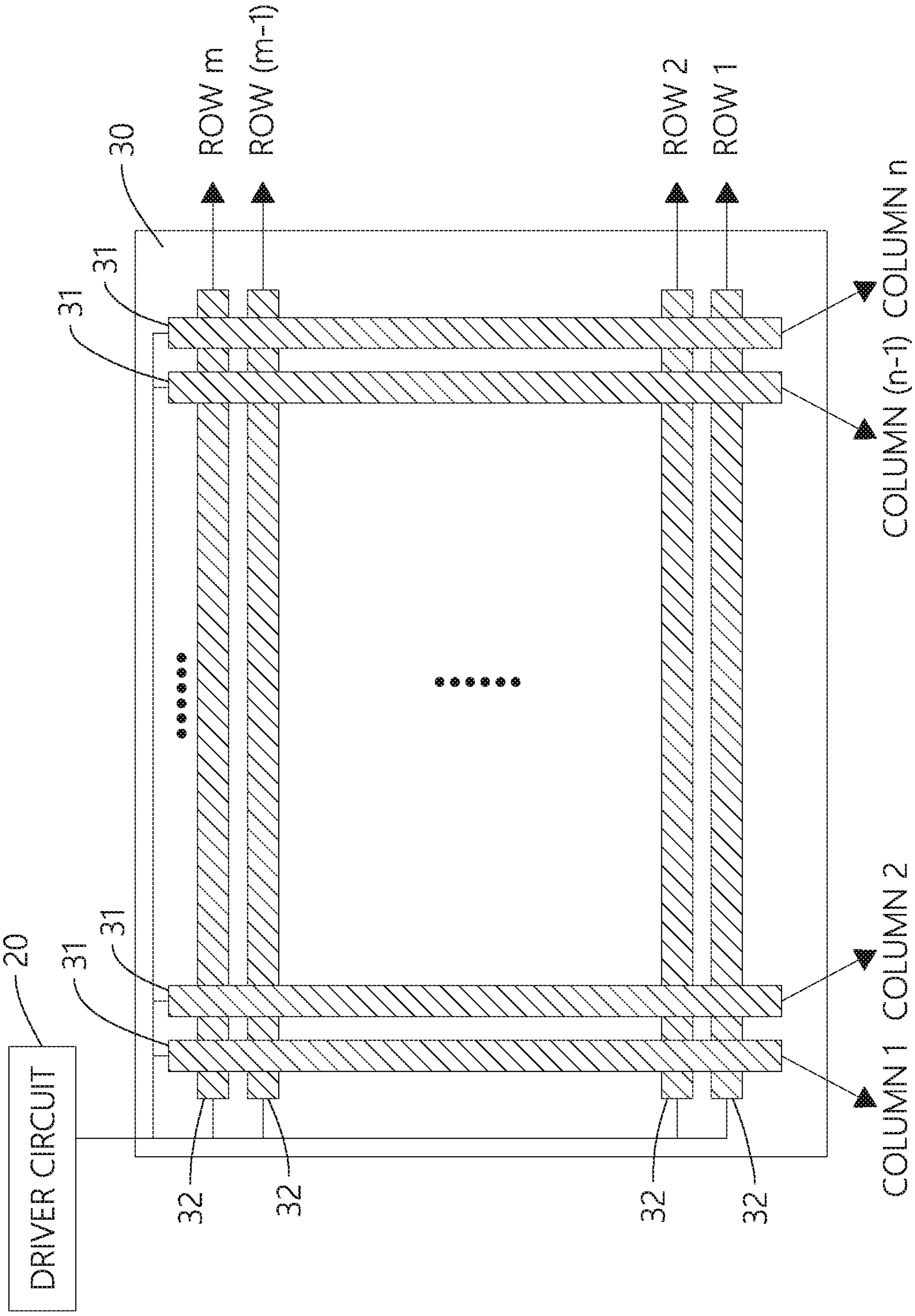
FIG. 2 is a perspective view of electrode structures of a screen of the multistable display of the present invention.

With reference to FIG. 2, FIG. 2 presents a structural perspective view of the screen 30. The screen 30 is a passive matrix constructed by vertical and horizontal intersections of a plurality of pixel electrodes 31 (from column 1 to column n) and a plurality of line electrodes 32 (from row 1 to row m). Each intersection of the pixel electrodes 31 and the line electrodes 32 forms a pixel. In other words, each pixel corresponds to one of the pixel electrodes 31 and one of the line electrodes 32. In FIG. 2, the display 30 includes n counts of pixel electrodes 31 and m counts of line electrodes 32, wherein n and m are positive integers greater than one. The driver circuit 20 drives the display 30 by outputting pixel driving signals to the pixel electrodes 31 and outputting line driving signals to the line electrodes 32. For example, the driver circuit 20 may respectively output the pixel driving signals to the pixel electrodes 31 and the line driving signals to the line electrodes 32 by scanning.

Figure 3A:
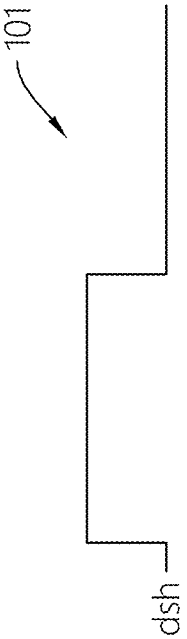
FIG. 3A is a waveform perspective view of a header setting signal outputted by a display setting header (dsh) control port in a first embodiment of the multistable display of the present invention.
Figure 3B:
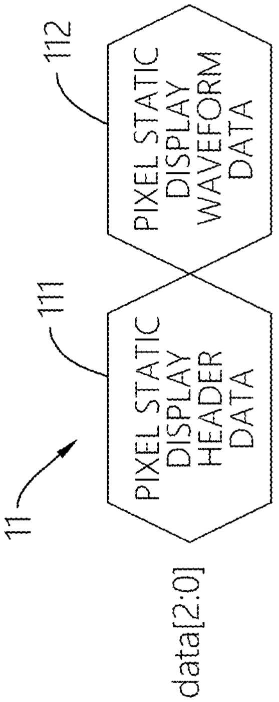
FIG. 3B is a perspective view of a data signal outputted by at least one data signal output port in the first embodiment of the multistable display of the present invention.

With references to FIGS. 3A and 3B, the time controller signal includes a data signal 11, and the data signal 11 includes a pixel static display header data 111 and a pixel static display waveform data 112. The driver circuit 20 determines a pixel display voltage value of a pixel display driver signal according to the pixel static display header data 111. The driver circuit 20 determines a pixel display driving time duration according to the pixel static display waveform data 112. In the present embodiment, the pixel display driver signal is the pixel driving signals outputted from the driver circuit 20 to the pixel electrodes 31.

As the driver circuit 20 determines the pixel display voltage value of the pixel display driver signal according to the pixel static display header data 111, and as the driver circuit 20 determines the pixel display driving time duration for outputting the pixel display driver signal with the pixel display voltage value according to the pixel static display waveform data 112, the driver circuit 20 is able to configure an entire waveform of the pixel display driver signal for each of the pixel electrodes 31 merely according to the pixel static display header data 111 and the pixel static display waveform data 112. In other words, the driver circuit 20 avoids needing to re-supply new voltage values for configuring a voltage waveform when adjusting the voltage waveform for driving the screen 30. As such, a clock rate and a duty count for driving the screen 30 is no longer correlated for the present invention. The present invention may therefore drastically decrease an amount of bits needed to transport and drive the screen 30. In comparison to a conventional multistable display, under a same condition of transporting a same amount of bits within a same time frame, the present invention is able to drive the screen 30 with a lower clock rate, thus decreasing a power consumption needed for driving the screen 30.

Figure 4A:
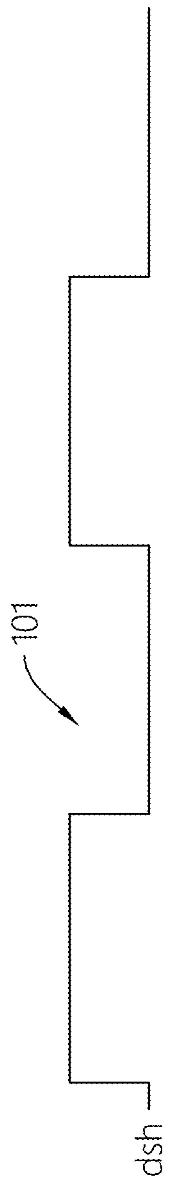
FIG. 4A is a waveform perspective view of the header setting signal outputted by the dsh control port in a second embodiment of the multistable display of the present invention.
Figure 4B:
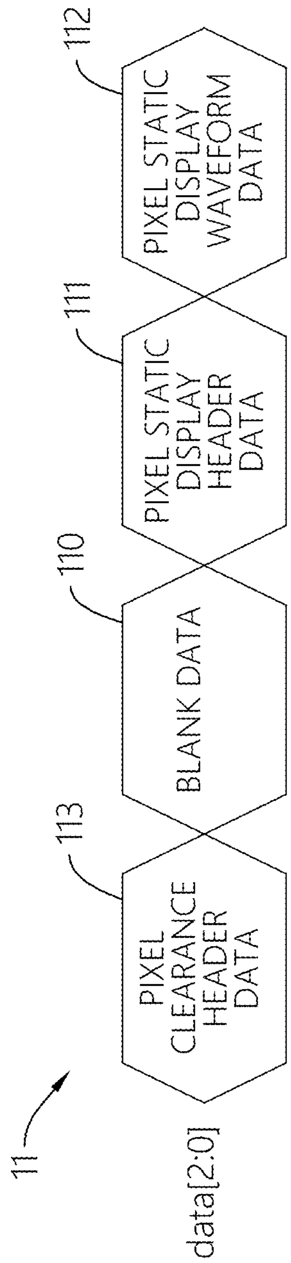
FIG. 4B is a perspective view of the data signal outputted by the at least one data signal output port in the second embodiment of the multistable display of the present invention.

With reference to FIGS. 4A and 4B, the data signal 11 further includes a pixel clearance header data 113. The driver circuit 20 determines a pixel clearance driver signal according to the pixel clearance header data 113. Conventionally, the pixel clearance driver signal has fixed waveforms, and thus, the driver circuit 20 is able to use the pixel clearance header data 113 to determine a pixel clearance voltage value for the pixel clearance driver signal, and then configure the pixel clearance driver signal to have fixed waveforms before outputting the pixel clearance driver signal to the screen 30.

Figure 5A:
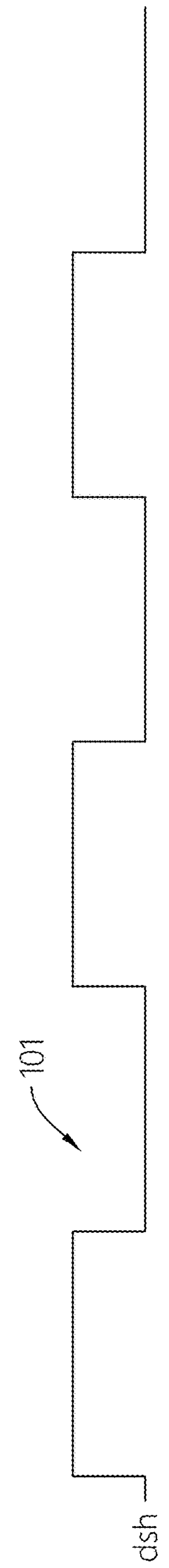
FIG. 5A is a waveform perspective view of the header setting signal outputted by the dsh control port in a third embodiment of the multistable display of the present invention.
Figure 5B:
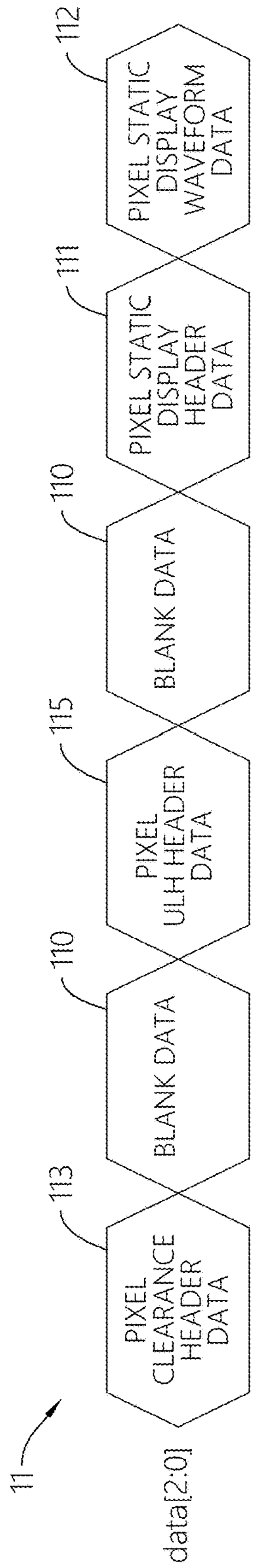
FIG. 5B is a perspective view of the data signal outputted by the at least one data signal output port in the third embodiment of the multistable display of the present invention.

With reference to FIGS. 5A and 5B, the data signal 11 further includes the pixel clearance header data 113 and a pixel uniform lying helix (ULH) header data 115. The driver circuit 20 determines the pixel clearance driver signal according to the pixel clearance header data 113, and the driver circuit 20 determines a pixel ULH driver signal according to the pixel ULH header data 115. Conventionally, the pixel clearance driver signal and the pixel ULH driver signal have fixed waveforms, and thus, the driver circuit 20 is able to use the pixel clearance header data 113 to determine a pixel clearance voltage value for the pixel clearance driver signal, and then configure the pixel clearance driver signal to have fixed waveforms before outputting the pixel clearance driver signal to the screen 30. Further, the driver circuit 20 is able to use the pixel ULH header data 115 to determine a pixel ULH voltage value for the pixel ULH driver signal, and then configure the pixel ULH driver signal to have fixed waveforms before outputting the pixel ULH driver signal to the screen 30.

Figure 6A:
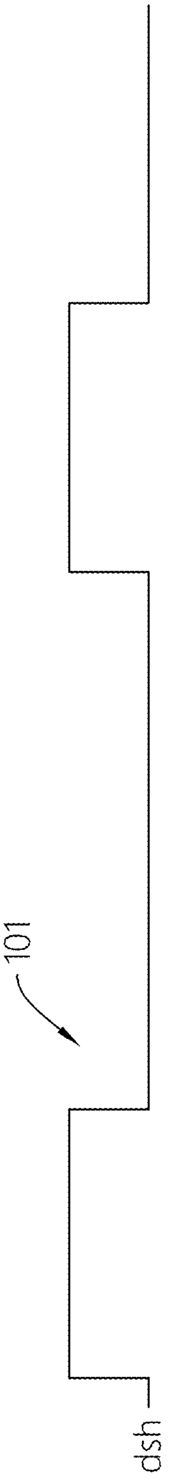
FIG. 6A is a waveform perspective view of the header setting signal outputted by the dsh control port in a fourth embodiment of the multistable display of the present invention.
Figure 6B:
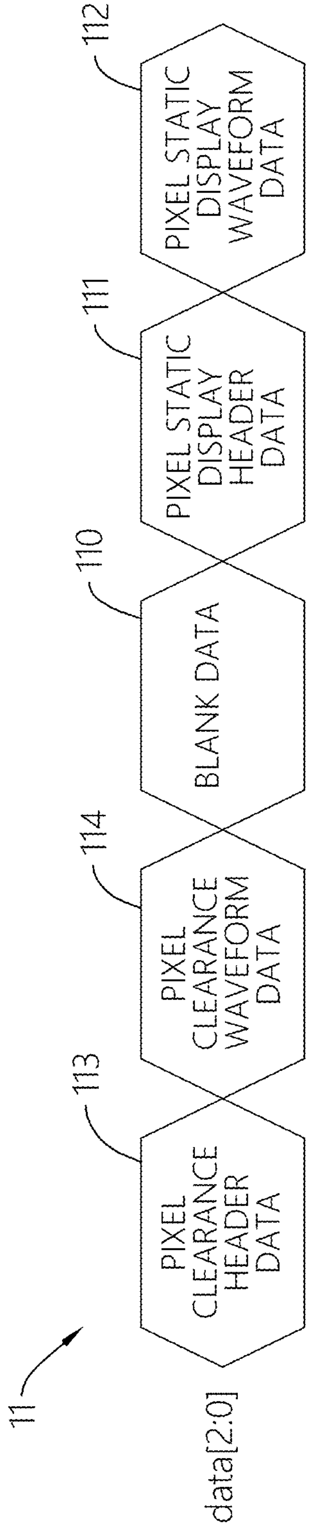
FIG. 6B is a perspective view of the data signal outputted by the at least one data signal output port in the fourth embodiment of the multistable display of the present invention.

With reference to FIGS. 6A and 6B, the data signal 11 further includes the pixel clearance header data 113 and a pixel clearance waveform data 114. The driver circuit 20 determines the pixel clearance voltage value according to the pixel clearance header data 113, and the driver circuit 20 determines a pixel clearance driving time duration according to the pixel clearance waveform data 114. In the present embodiment, the pixel clearance driver signal is the pixel driving signals outputted from the driver circuit 20 to the pixel electrodes 31.

Figure 7A:
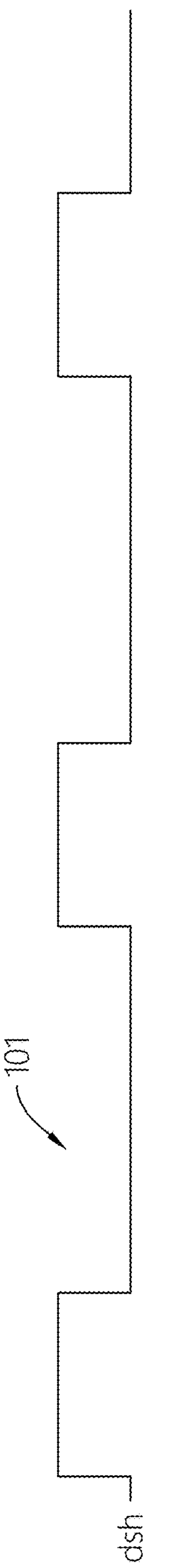
FIG. 7A is a waveform perspective view of the header setting signal outputted by the dsh control port in a fifth embodiment of the multistable display of the present invention.
Figure 7B:
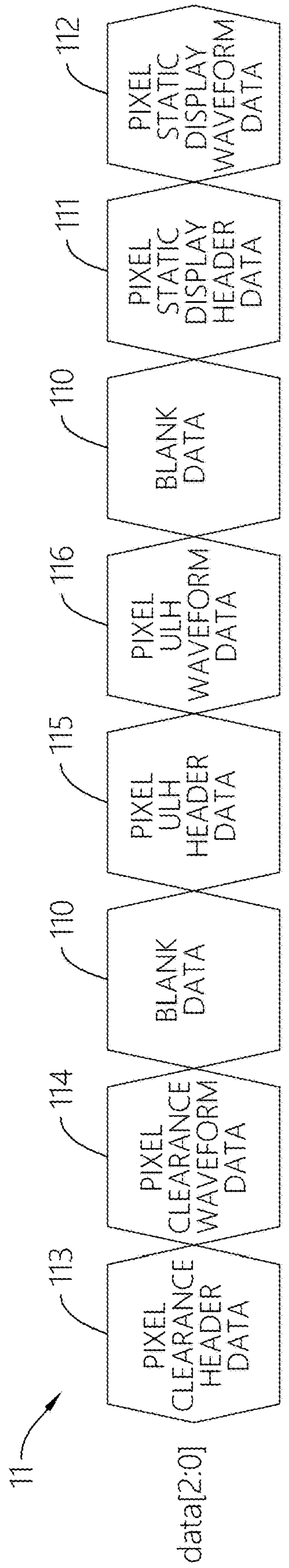
FIG. 7B is a perspective view of the data signal outputted by the at least one data signal output port in the fifth embodiment of the multistable display of the present invention.

With reference to FIGS. 7A and 7B, the data signal 11 further includes the pixel clearance header data 113, the pixel clearance waveform data 114, the pixel ULH header data 115, and a pixel ULH waveform data 116. The driver circuit 20 determines the pixel clearance voltage value according to the pixel clearance header data 113, and the driver circuit 20 determines the pixel clearance driving time duration according to the pixel clearance waveform data 114. The driver circuit 20 determines the pixel ULH voltage value according to the pixel ULH header data 115, and the driver circuit 20 determines a pixel ULH driving time duration according to the pixel ULH waveform data 116. In the present embodiment, the pixel clearance driver signal and the pixel ULH driver signal are the pixel driving signals outputted from the driver circuit 20 to the pixel electrodes 31.

Furthermore, the data signal 11 also includes a blank data 110. With reference to FIG. 4B, the blank data 110 may be placed between the pixel clearance header data 113 and the pixel static display header data 111. With reference to FIG. 5B, the blank data 110 may be placed between the pixel clearance header data 113 and the pixel ULH header data 115, and between the pixel ULH header data 115 and the pixel static display header data 111. With reference to FIG. 6B, the blank data 110 may be placed between the pixel clearance waveform data 114 and the pixel static display header data 111. With reference to FIG. 7B, the blank data 110 may be placed between the pixel clearance waveform data 114 and the pixel ULH header data 115, and between the pixel ULH waveform data 116 and the pixel static display header data 111.

A time window occupied by the blank data 110 allows the driver circuit 20 to output the pixel clearance driver signal or the pixel ULH driver signal to the screen 30.

More particularly, with reference to FIG. 1, in an embodiment, the time controller circuit 10 includes a clock (clk) signal output port, a display output enable (doe) control port, a display output ground (dog) control port, and a display start pulse (dsp) control port. The clk signal output port, the doe control port, the dog control port, and the dsp control port of the time controller circuit 10 are functionally identical with those on a time controller circuit of the conventional multistable display described in prior art, and thus further detail detailed description is omitted.

The time controller circuit 10 may also include a display setting header (dsh) control port and at least one data signal output port. In other embodiments, the at least one data signal output port of the time controller circuit 10 includes a plurality of data output ports (data 0 to data n), such as a first data output port (data 0) to a $(n+1)^{th}$ data output port (data n), and n is free to be any positive integers. For ease of demonstrating the technical features of the present invention, in the present embodiment, an example of having the first data output port (data 0) to a third data output port (data 2) is chosen for the following parts of the detailed description.

The dsh control port is connected to the driver circuit 20, and the dsh control port outputs a header setting signal 101 to the driver circuit 20. The data output ports (data 0 to data 2) are connected to the driver circuit 20 for outputting the data signal 11 to the driver circuit 20.

With reference to FIGS. 3A and 3B, when the data signal 11 outputted from the data output ports (data 0 to data 2) is the pixel static display header data 111, the dsh control port outputs the header setting signal 101 at a high voltage. With reference to FIGS. 4A and 4B, when the data signal 11 outputted from the data output ports (data 0 to data 2) is the pixel clearance header data 113, the dsh control port also outputs the header setting signal 101 at the high voltage. With reference to FIGS. 5A and 5B, when the data signal 11 outputted from the data output ports (data 0 to data 2) is the pixel ULH header data 115, the dsh control port also outputs the header setting signal 101 at the high voltage. However, with reference to FIGS. 7A and 7B, when the data signal 11 outputted from the data output ports (data 0 to data 2) is neither the pixel clearance header data 113 nor the pixel ULH header data 115 nor the pixel static display header data 111, the dsh control port outputs the header setting signal 101 at a low voltage.

In other words, whenever the dsh control port outputs the header setting signal 101 at the high voltage, the data signal 11 outputted from the data output ports (data 0 to data 2) would be either the pixel clearance header data 113 or the pixel ULH header data 15 or the pixel static display header data 111. As such, the driver circuit 20 is able to determine whether the data signal 11 currently receiving is the pixel clearance header data 113 or the pixel ULH header data 15 or the pixel static display header data 111 according to a voltage of the header setting signal 101.

Figure 8A:
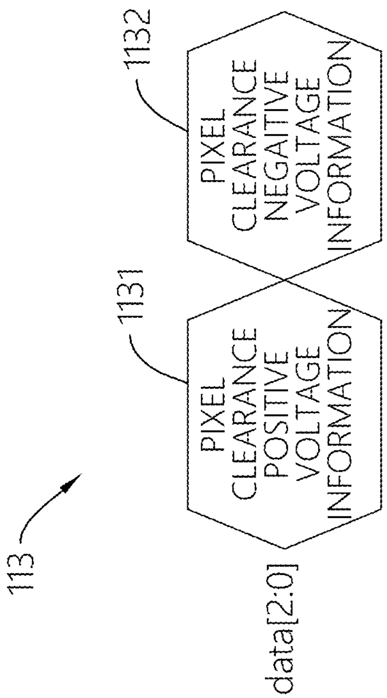
FIG. 8A is a perspective view of a pixel clearance header data of the data signal outputted by the at least one data signal output port of the multistable display of the present invention.
Figure 8B:
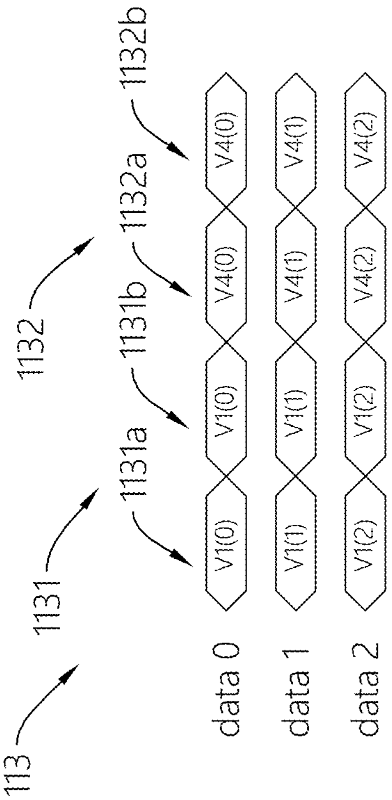
FIG. 8B is a perspective view of the pixel clearance header data of the data signal outputted by first to third data output ports (data 0 to data 2) of the multistable display of the present invention.

With reference to FIGS. 8A and 8B, the pixel clearance header data 113 includes a pixel clearance positive voltage information 1131 and a pixel clearance negative voltage information 1132. The pixel clearance header data 113 also includes a clearance clock information, and the clearance clock information signifies a clock count included in a clearance unit time. The clock count included in the clearance unit time is counted as clock numbers for a duty cycle. For example, the clearance clock information is binary codes and is represented in 3 bits, and the 3 bits binary codes can be converted to decimal numbers. For instance, reading the binary code "000" gives the decimal number "0", reading the binary code "001" gives the decimal number "1", reading the binary code "010" gives the decimal number "2", reading the binary code "011" gives the decimal number "3", reading the binary code "100" gives the decimal number "4", reading the binary code "101" gives the decimal number "5", reading the binary code "110" gives the decimal number "6", and reading the binary code "111" gives the decimal number "7". For example, when the clearance clock information is configured as the binary code "100", each corresponding duty is configured to include a time equivalent of 4 clock numbers.

The pixel clearance positive voltage information 1131 further includes a first pixel clearance positive voltage value 1131*a* and a second pixel clearance positive voltage value 1131*b*. The pixel clearance negative voltage information 1132 further includes a first pixel clearance negative voltage value 1132*a* and a second pixel clearance negative voltage value 1132*b*. In the present embodiment, the first pixel clearance positive voltage value 1131*a* is a first set of values outputted from the first to the third data output ports (data 0 to data 2), and the first pixel clearance positive voltage value 1131*a* is presented in a 3 bits binary code, respectively as V1(0) to V1(2), for corresponding to a first voltage V1. For example, the first voltage V1 corresponds to the binary code "001", i.e. V1(2)=0, V1(1)=0, and V1(0)=1. The second pixel clearance positive voltage value 1131*b* is a second set of values outputted from the first to the third data output ports (data 0 to data 2), and the second pixel clearance positive voltage value 1131*b* is also presented in a 3 bits binary code, for corresponding to the first voltage V1. Similarly, the first pixel clearance negative voltage value 1132*a* is a third set of values outputted from the first to the third data output ports (data 0 to data 2), and the first pixel clearance negative voltage value 1132*a* is presented in a 3 bits binary code, respectively as V4(0) to V4(2), for corresponding to a fourth voltage V4. For example, the fourth voltage V4 corresponds to 100, i.e. V4(2)=1, V4(1)=0, and V4(0)=0. The second pixel clearance negative voltage value 1132*b* is a fourth set of values outputted from the first to the third data output ports (data 0 to data 2), and the second pixel clearance negative voltage value 1132*b* is also presented in a 3 bits binary code, for corresponding to the fourth voltage V4.

Figure 9A:
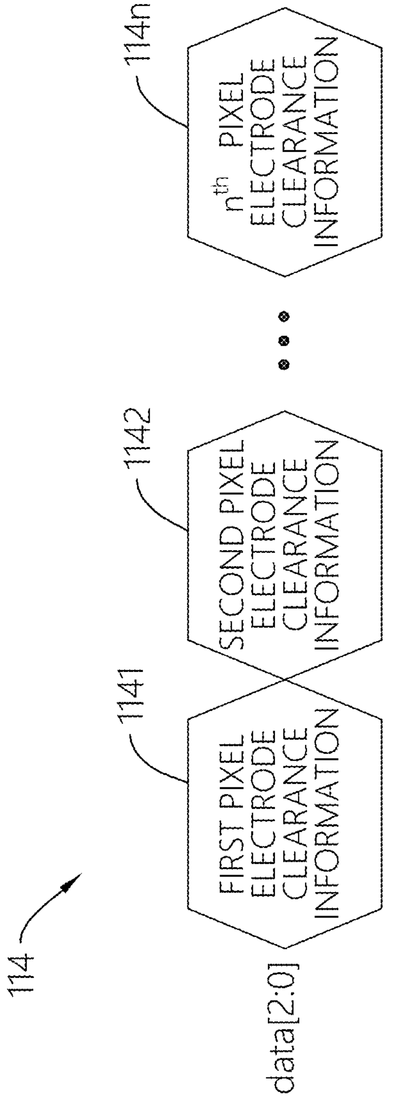
FIG. 9A is a perspective view of a pixel clearance waveform data of the data signal outputted by the at least one data signal output port of the multistable display of the present invention.
Figure 9B:
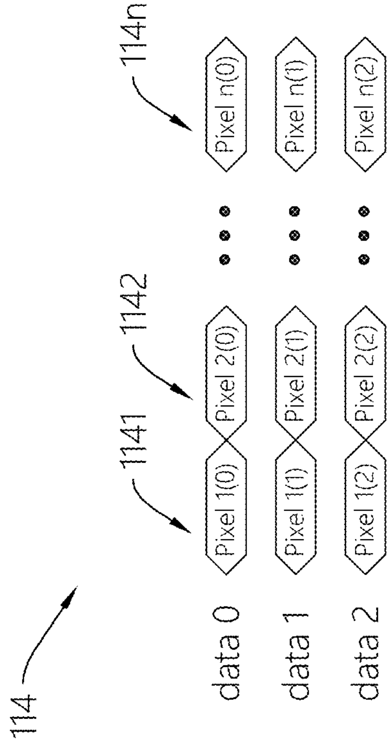
FIG. 9B is a perspective view of the pixel clearance waveform data of the data signal outputted by first to third data output ports (data 0 to data 2) of the multistable display of the present invention.

With reference to FIGS. 9A and 9B, the pixel clearance waveform data 114 includes a plurality of pixel electrode clearance information (1141 to 114*n*). The pixel electrode clearance information (1141 to 114*n*) at least includes a first pixel electrode clearance information 1141, and the first pixel electrode clearance information 1141 includes a first clearance voltage duty number. In the present embodiment, the first clearance voltage duty number is taken from the first to the third data output ports (data 0 to data 2), and the first clearance voltage duty number is represented in a 3 bits binary code, respectively as pixel 1(0) to pixel 1(2), for corresponding to a first pixel electrode. In other words, the first clearance voltage duty number is a combination of numbers taken from the first to the third data output ports (data 0 to data 2). The pixel electrode clearance information (1141 to 114*n*) also includes the second to the $n^{th}$ pixel electrode clearance information (1142 to 114*n*), and the second to the $n^{th}$ pixel electrode clearance information (1142 to 114*n*) respectively includes a second clearance voltage duty number to an $n^{th}$ clearance voltage duty number. Similarly, the second clearance voltage duty number is a combination of numbers taken from the first to the third data output ports (data 0 to data 2), and the second clearance voltage duty number is represented in a 3 bits binary code, respectively as pixel 2(0) to pixel 2(2), for corresponding to a second pixel electrode.

Furthermore, the driver circuit 20 includes a duty count, and the driver circuit 20 calculates a first remaining clearance voltage duty number by subtracting the first clearance voltage duty number from the duty count. For example, the duty count is 7. When the first clearance voltage duty number is "100", a corresponding decimal number is 4. As the driver circuit 20 subtracts the first clearance voltage duty number from the duty count, i.e. 7−4=3, the driver circuit 20 is able to calculate, obtain, and configure the first remaining clearance voltage duty number as 3. In another example, when the first clearance voltage duty number is "111", a corresponding decimal number of 7 is obtained, and therefore, the driver circuit 20 subtracts the first clearance voltage duty number from the duty count, i.e. 7−7=0, resulting in the driver circuit 20 configuring the first remaining clearance voltage duty number as 0.

In the present embodiment, the pixel clearance header data 113 further includes a duty count information. The driver circuit 20 utilizes the duty count information to configure the duty count.

Furthermore, when the driver circuit 20 determines the pixel clearance driving time duration, for outputting the pixel clearance driver signal with the pixel clearance voltage value, according to the pixel clearance waveform data 114, the driver circuit 20 configures a first clearance time duration according to the first clearance voltage duty number of the pixel clearance waveform data 114, and the driver circuit 20 outputs the pixel clearance driver signal with the first pixel clearance positive voltage value to the first pixel electrode for the first clearance time duration. The driver circuit 20 further configures a second clearance time duration according to the first remaining clearance voltage duty number, and the driver circuit 20 outputs the pixel clearance driver signal with the second pixel clearance positive voltage value to the first pixel electrode for the second clearance time duration. Furthermore, the driver circuit 20 configures a third clearance time duration according to the first clearance voltage duty number of the pixel clearance waveform data 114, and the driver circuit 20 outputs the pixel clearance driver signal with the first pixel clearance negative voltage value to the first pixel electrode for the third clearance time duration. The driver circuit 20 further configures a fourth clearance time duration according to the first remaining clearance voltage duty number, and the driver circuit 20 outputs the pixel clearance driver signal with the second pixel clearance negative voltage value to the first pixel electrode for the fourth clearance time duration.

Figure 10A:
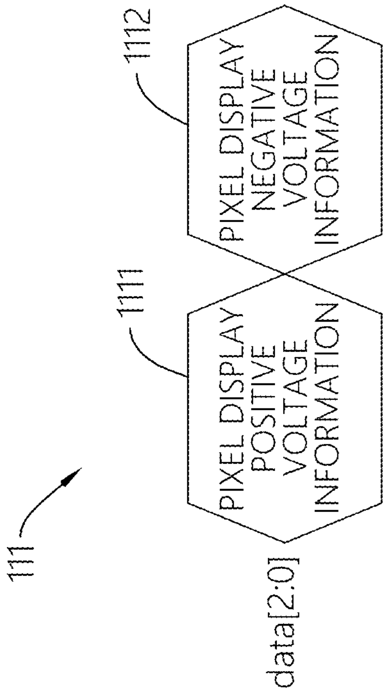
FIG. 10A is a perspective view of a pixel static display header data of the data signal outputted by the at least one data signal output port of the multistable display of the present invention.
Figure 10B:
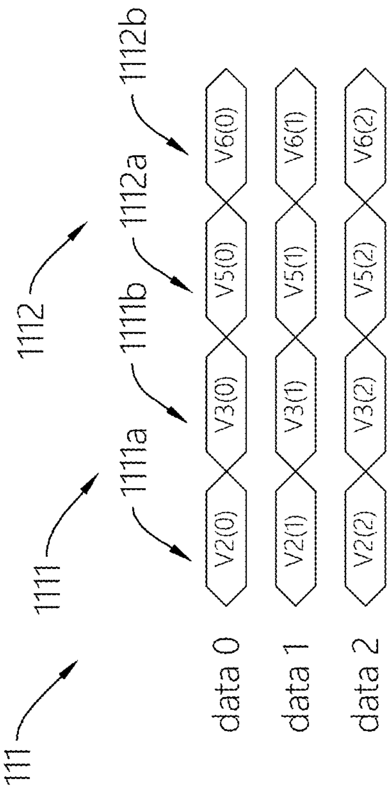
FIG. 10B is a perspective view of the pixel static display header data of the data signal outputted by first to third data output ports (data 0 to data 2) of the multistable display of the present invention.

With reference to FIGS. 10A and 10B, the pixel static display header data 111 includes a pixel display positive voltage information 1111 and a pixel display negative voltage information 1112. The pixel static display header data 111 also further includes a display clock information, and the display clock information signifies a clock count included in a display unit time. The clock count included in the display unit time is counted as clock numbers for a duty cycle. For example, the display clock information is represented in 3 bits binary codes, and the 3 bits binary codes can be converted to decimal numbers, such as 0 to 7. For example, the 3 bits binary code "000" corresponds to the decimal number of 0, the 3 bits binary code "001" corresponds to the decimal number of 1, the 3 bits binary code "010" corresponds to the decimal number of 2, the 3 bits binary code "011" corresponds to the decimal number of 3, the 3 bits binary code "100" corresponds to the decimal number of 4, the 3 bits binary code "101" corresponds to the decimal number of 5, the 3 bits binary code "110" corresponds to the decimal number of 6, and the 3 bits binary code "111" corresponds to the decimal number of 7. In other words, when the display clock information is configured as "100", each of the duty cycle includes 4 counts of clock number.

The pixel display positive voltage information 1111 further includes a first pixel display positive voltage value 1111*a* and a second pixel display positive voltage value 1111*b*. The pixel display negative voltage information 1112 further includes a first pixel display negative voltage value 1112*a* and a second pixel display negative voltage value 1112*b*. In the present embodiment, the first pixel display positive voltage value 1111*a* is a first set of values outputted from the first to the third data output ports (data 0 to data 2), and the first pixel display positive voltage value 1111*a* is presented in a 3 bits binary code, respectively as V2(0) to V2(2), for corresponding to a second voltage V2. For example, the second voltage V2 corresponds to "010", i.e. V2(2)=0, V2(1)=1, and V2(0)=0. The second pixel display positive voltage value 1111*b* is a second set of values outputted from the first to the third data output ports (data 0 to data 2), and the second pixel display positive voltage value 1111*b* is also presented in a 3 bits binary code, for corresponding to a third voltage V3. For example, the third voltage V3 corresponds to "011", i.e. V3(2)=0, V3(1)=1, and V3(0)=1. Similarly, the first pixel display negative voltage value 1112*a* is a third set of values outputted from the first to the third data output ports (data 0 to data 2), and the first pixel display negative voltage value 1112*a* is presented in a 3 bits binary code, respectively as V5(0) to V5(2), for corresponding to a fifth voltage V5. For example, the fifth voltage V5 corresponds to "101", i.e. V5(2)=1, V5(1)=0, and V5(0)=1. The second pixel display negative voltage value 1112*b* is a fourth set of values outputted from the first to the third data output ports (data 0 to data 2), and the second pixel display negative voltage value 1112*b* is also presented in a 3 bits binary code, respectively as V6(0) to V6(2), for corresponding to a sixth voltage V6. For example, the sixth voltage V6 corresponds to "110", i.e. V6(2)=1, V6(1)=1, and V6(0)=0.

Figure 11A:
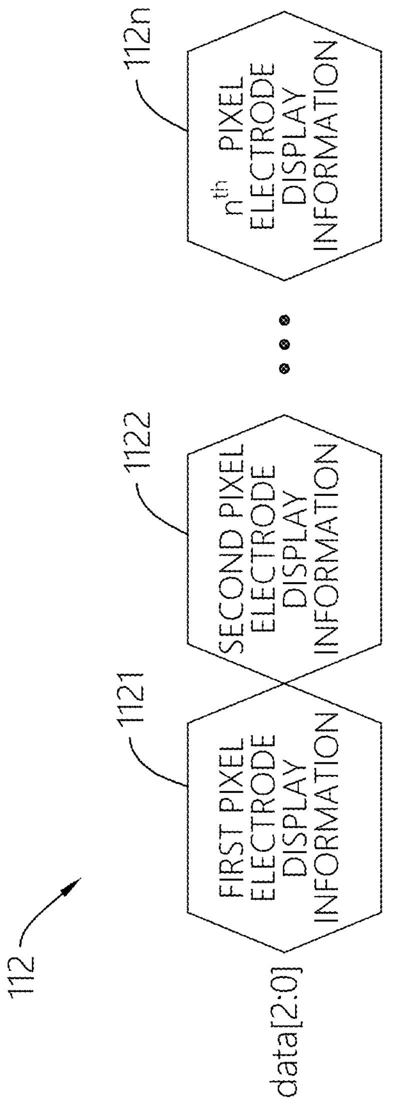
FIG. 11A is a perspective view of a pixel static display waveform data of the data signal outputted by the at least one data signal output port of the multistable display of the present invention.
Figure 11B:
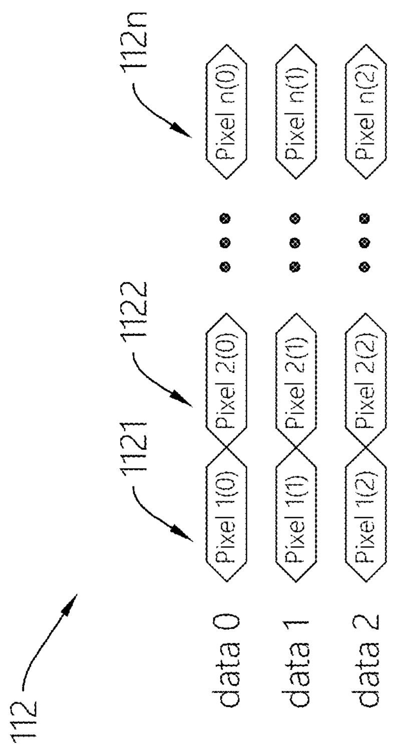
FIG. 11B is a perspective view of the pixel static display waveform data of the data signal outputted by first to third data output ports (data 0 to data 2) of the multistable display of the present invention.

With reference to FIGS. 11A and 11B, the pixel static display waveform data 112 includes a plurality of pixel electrode display information (1121 to 112*n*). The pixel electrode display information (1121 to 112*n*) at least includes a first pixel electrode display information 1121, and the first pixel electrode display information 1121 includes a first display voltage duty number. In the present embodiment, the first display voltage duty number is taken from the first to the third data output ports (data 0 to data 2), and the first display voltage duty number is represented in a 3 bits binary code, respectively as pixel 1(0) to pixel 1(2), for corresponding to a first pixel electrode. In other words, the first display voltage duty number is a combination of numbers taken from the first to the third data output ports (data 0 to data 2). The pixel electrode display information (1121 to 112*n*) also includes the second to the $n^{th}$ pixel electrode display information (1122 to 112*n*), and the second to the $n^{th}$ pixel electrode display information (1122 to 112*n*) respectively includes a second display voltage duty number to an $n^{th}$ display voltage duty number. Similarly, the second display voltage duty number is a combination of numbers taken from the first to the third data output ports (data 0 to data 2), and the second display voltage duty number is represented in a 3 bits binary code, respectively as pixel 2(0) to pixel 2(2), for corresponding to the second pixel electrode.

Furthermore, the driver circuit 20 includes the duty count, and the driver circuit 20 calculates a first remaining display voltage duty number by subtracting the first display voltage duty number from the duty count. For example, the duty count is 7. When the first display voltage duty number is "100", a corresponding decimal number is 4. As the driver circuit 20 subtracts the first display voltage duty number from the duty count, i.e. 7−4=3, the driver circuit 20 is able to calculate, obtain, and configure the first remaining display voltage duty number as 3. In another example, when the first display voltage duty number is "111", a corresponding decimal number of 7 is obtained, and therefore, the driver circuit 20 subtracts the first display voltage duty number from the duty count, i.e. 7−7=0, resulting in the driver circuit 20 configuring the first remaining display voltage duty number as 0.

In the present embodiment, the pixel clearance header data 111 further includes the duty count information. The driver circuit 20 utilizes the duty count information to configure the duty count.

Moreover, when the driver circuit 20 determines the pixel display driving time duration, for outputting the pixel display driver signal with the pixel display voltage value, the driver circuit 20 configures a first display time duration according to the first display voltage duty number of the pixel static display waveform data 112, and the driver circuit 20 outputs the pixel display driver signal with the first pixel display positive voltage value to the first pixel electrode for the first display time duration. The driver circuit 20 further configures a second display time duration according to the first remaining display voltage duty number, and the driver circuit 20 outputs the pixel display driver signal with the second pixel display positive voltage value to the first pixel electrode for the second display time duration. Furthermore, the driver circuit 20 configures a third display time duration according to the first display voltage duty number of the pixel static display waveform data 112, and the driver circuit 20 outputs the pixel display driver signal with the first pixel display negative voltage value to the first pixel electrode for the third display time duration. The driver circuit 20 also configures a fourth display time duration according to the first remaining display voltage duty number, and the driver circuit 20 outputs the pixel display driver signal with the second pixel display negative voltage value to the first pixel electrode for the fourth display time duration.

Figure 12:
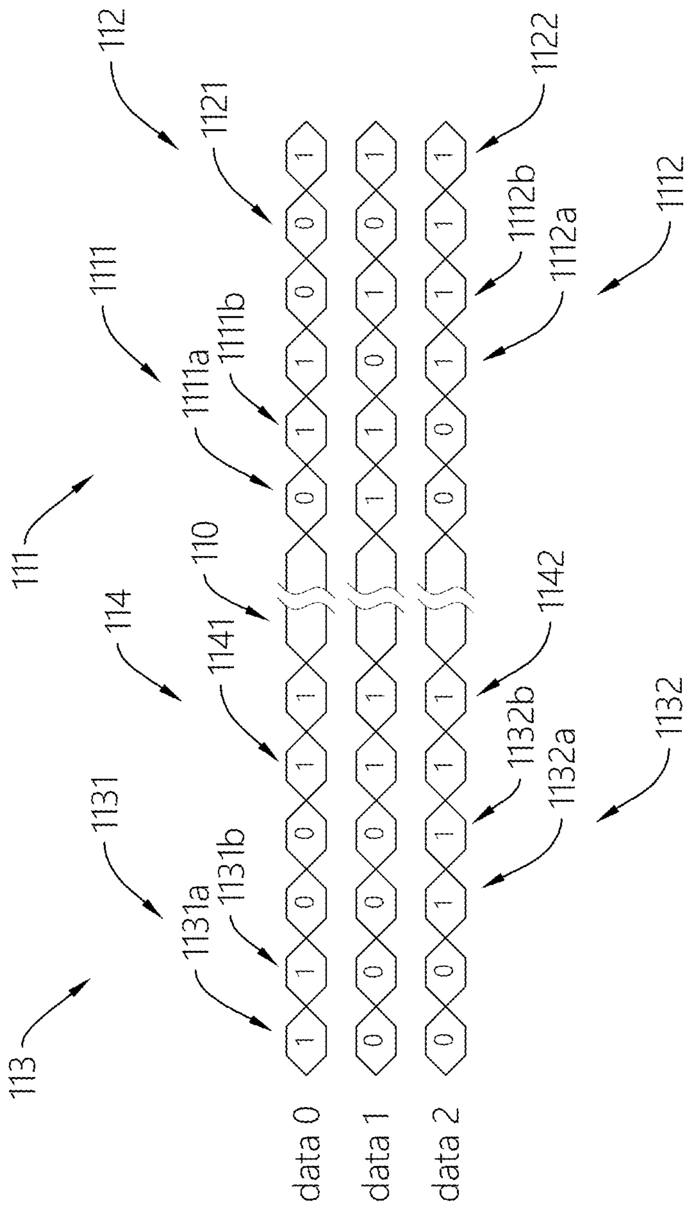
FIG. 12 is a perspective view of the data signal outputted by first to third data output ports (data 0 to data 2) of the multistable display of the present invention.

With reference to FIG. 12, for example, the duty count is configured as an integer 7. As shown for the first pixel electrode clearance information 1141, the first clearance voltage duty number is 111. As shown for the second pixel electrode clearance information 1142, the second clearance voltage duty number is "111". As shown for the first pixel clearance positive voltage value 1131*a*, the first pixel clearance positive voltage value is the first voltage V1, i.e. "001". As shown for the second pixel clearance positive voltage value 1131*b*, the second pixel clearance positive voltage value is the first voltage V1, i.e. "001". As shown for the first pixel clearance negative voltage value 1132*a*, the first pixel clearance negative voltage value is the fourth voltage V4, i.e. "100". As shown for the second pixel clearance negative voltage value 1132*b*, the second pixel clearance negative voltage value is the fourth voltage V4, i.e. "100". As shown for the first pixel electrode display information 1121, the first display voltage duty number is "100". As shown for the second pixel electrode display information 1122, the second display voltage duty number is "111". As shown for the first pixel display positive voltage value 1111*a*, the first pixel display positive voltage value is the second voltage V2, i.e. "010". As shown for the second pixel display positive voltage value 1111*b*, the second pixel display positive voltage value is the third voltage V3, i.e. "011". As shown for the first pixel display negative voltage value 1112*a*, the first pixel display negative voltage value is the fifth voltage V5, i.e. "101". As shown for the second pixel display negative voltage value 1112*b*, the second pixel display negative voltage value is the sixth voltage V6, i.e. "110".

For example, in an embodiment, when the first clearance voltage duty number is "111", the driver circuit 20 outputs the pixel clearance driver signal with the first pixel clearance positive voltage value, i.e. the first voltage V1, to the first pixel electrode for the first clearance time duration of 7 clocks of duty time. Moreover, since the duty count is 7, the first remaining clearance voltage duty number is 0. The driver circuit 20 outputs the pixel clearance driver signal with the second pixel clearance positive voltage value, i.e. the first voltage V1, to the first pixel electrode for the second clearance time duration of 0 clock of duty time.

As the driver circuit 20 enters a negative half cycle, the driver circuit 20 outputs the pixel clearance driver signal with the first pixel clearance negative voltage value, i.e. the fourth voltage V4, to the first pixel electrode for the first clearance time duration of 7 clocks of duty time. Moreover, since the duty count is 7, the first remaining clearance voltage duty number is 0. The driver circuit 20 outputs the pixel clearance driver signal with the second pixel clearance negative voltage value, i.e. the fourth voltage V4, to the first pixel electrode for the second clearance time duration of 0 clock of duty time.

Similarly, when the second clearance voltage duty number is "111", the driver circuit 20 outputs the pixel clearance driver signal with the first pixel clearance positive voltage value, i.e. the first voltage V1, to the second pixel electrode for the first clearance time duration of 7 clocks of duty time. Moreover, since the duty count is 7, the first remaining clearance voltage duty number is 0. The driver circuit 20 outputs the pixel clearance driver signal with the second pixel clearance positive voltage value, i.e. the first voltage V1, to the second pixel electrode for the second clearance time duration of 0 clock of duty time.

As the driver circuit 20 enters the negative half cycle, the driver circuit 20 outputs the pixel clearance driver signal with the first pixel clearance negative voltage value, i.e. the fourth voltage V4, to the second pixel electrode for the first clearance time duration of 7 clocks of duty time. Similarly, since the duty count is 7, the first remaining clearance voltage duty number is 0. The driver circuit 20 outputs the pixel clearance driver signal with the second pixel clearance negative voltage value, i.e. the fourth voltage V4, to the second pixel electrode for the second clearance time duration of 0 clock of duty time.

Moreover, when the first display voltage duty number is "100", the driver circuit 20 outputs the pixel display driver signal with the first pixel display positive voltage value, i.e. the second voltage V2, to the first pixel electrode for the first display time duration of 4 clocks of duty time. Moreover, as the duty count is 7, the first remaining display voltage duty number is 3. The driver circuit 20 outputs the pixel display driver signal with the second pixel display positive voltage value, i.e. the third voltage V3, to the first pixel electrode for the second display time duration of 3 clocks of duty time.

As the driver circuit 20 enters the negative half cycle, the driver circuit 20 outputs the pixel display driver signal with the first pixel display negative voltage value, i.e. the fifth voltage V5, to the first pixel electrode for the first display time duration of 4 clocks of duty time. Moreover, as the duty count is 7, the first remaining display voltage duty number is 3. The driver circuit 20 outputs the pixel display driver signal with the second pixel display negative voltage value, i.e. the sixth voltage V6, to the first pixel electrode for the second display time duration of 3 clocks of duty time.

Similarly, when the second display voltage duty number is "111", the driver circuit 20 outputs the pixel display driver signal with the first pixel display positive voltage value, i.e. the second voltage V2, to the second pixel electrode for the first display time duration of 7 clocks of duty time. Moreover, as the duty count is 7, the first remaining display voltage duty number is 0. The driver circuit 20 outputs the pixel display driver signal with the second pixel display positive voltage value, i.e. the third voltage V3, to the second pixel electrode for the second display time duration of 0 clock of duty time.

As the driver circuit 20 enters the negative half cycle, the driver circuit 20 outputs the pixel display driver signal with the first pixel display negative voltage value, i.e. the fifth voltage V5, to the second pixel electrode for the first display time duration of 7 clocks of duty time. Moreover, as the duty count is 7, the first remaining display voltage duty number is 0. The driver circuit 20 outputs the pixel display driver signal with the second pixel display negative voltage value, i.e. the sixth voltage V6, to the second pixel electrode for the second display time duration of 0 clock of duty time.

Figure 13A:
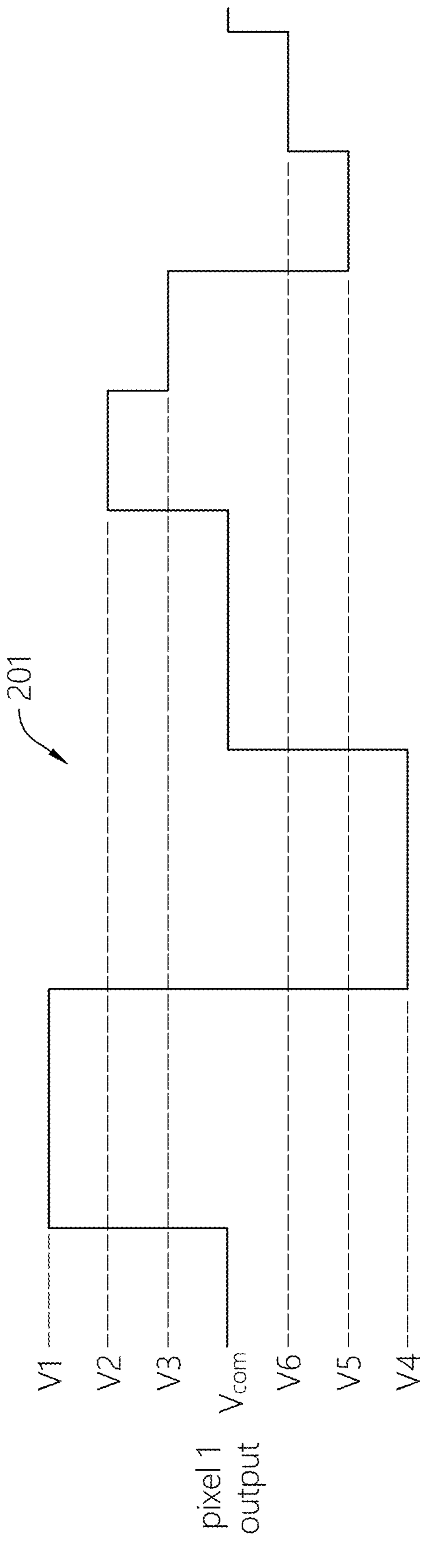
FIG. 13A is a waveform perspective view of a pixel driver signal outputted from a driver circuit to a first pixel electrode in the multistable display of the present invention.
Figure 13B:
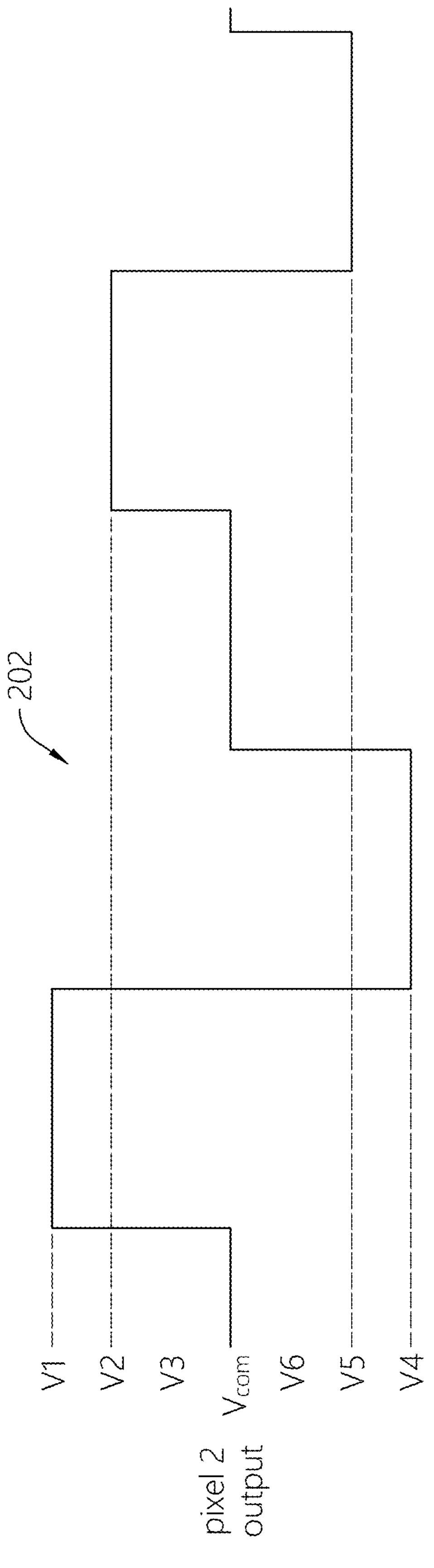
FIG. 13B is a waveform perspective view of the pixel driver signal outputted from the driver circuit to a second pixel electrode in the multistable display of the present invention.

With reference to FIGS. 13A and 13B, FIG. 13A is a waveform perspective view of the first pixel display driver signal 201 outputted from the driver circuit 20 to the first pixel electrode. FIG. 13B is a waveform perspective view of the second pixel display driver signal 202 outputted from the driver circuit 20 to the second pixel electrode.

In an example, the multistable display driven by CDS is configured to display Full HD resolution of 1920×1080. When using single data rate (SDR) for transporting data, each cycle of the clock signal is able to include and transport data for one pixel, thus in other words, the pixel per clock is 1. Furthermore, a transportation time ($T_{line}$) is configured to be 5 milliseconds (ms).

A clock rate of the multistable display driven by CDS is calculated with the following formula:

$$\text{clock rate (Hz)} = \frac{\text{(resolution)}}{\text{(piexl per clock)}} \times \frac{1}{(T_{line})}$$

More particularly, when the resolution is 1920, the pixel per clock under SDR is 1, the transportation time ($T_{line}$) is configured as 5 ms, and the clock rate is obtained as shown in the following Table 2:

TABLE 2

| Resolution | Mode | Pixel per clock | Duty count | $T_{line}$ | Clock rate |
|---|---|---|---|---|---|
| Full HD (1920 ×1080) | SDR | 1 | 64 | 5 (ms) | 384.8 (kHz) |

Comparing Table 1 and Table 2, the clock rate of the multistable display driven by CDS is lower than a clock rate of the conventional multistable display, and thus the multistable display of the present invention is able to decrease power consumption.

Figure 14:
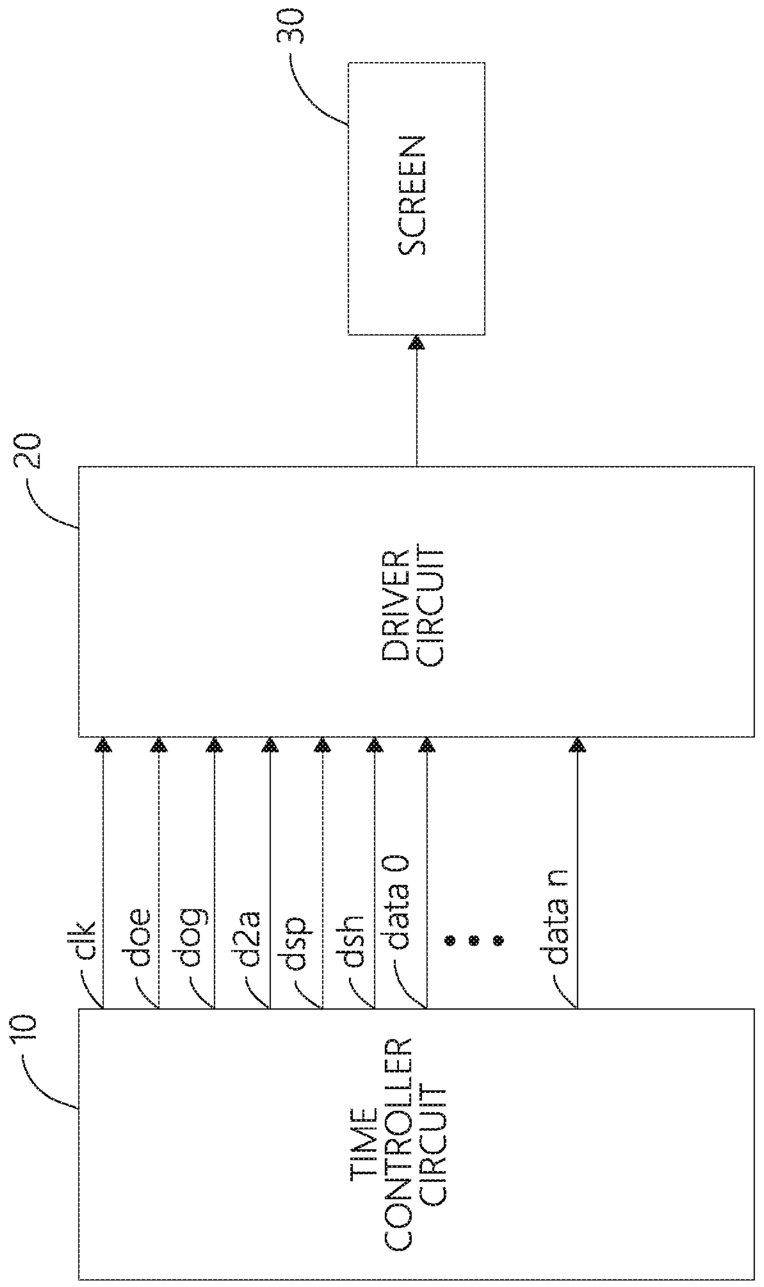
FIG. 14 is another block diagram of the multistable display of the present invention.

With reference to FIG. 14, in an embodiment, the time controller circuit 10 includes a clock (clk) signal output port, a display output enable (doe) control port, a display output ground (dog) control port, a display start pulse (dsp) control port, and a digital to analog (d2a) control port. The clock (clk) signal output port, the display output enable (doe) control port, the display output ground (dog) control port, and the display start pulse (dsp) control port of the time controller circuit 10 are functionally identical with those on a time controller circuit of the conventional multistable display described in prior art, and thus further detailed description is omitted.

Furthermore, the digital to analog control port (d2a) is connected to the driver circuit 20. The time controller circuit 10 also includes the dsh control port and the at least one data signal output port. In other embodiments, the at least one data signal output port of the time controller circuit 10 includes the plurality of data output ports (data 0 to data n), such as the first data output port (data 0) to the $(n+1)^{th}$ data output port (data n), wherein n is free to be any positive integers. In the present embodiment, the time controller circuit 10 includes the first data output port (data 0) to the third data output port (data 2).

Figure 15A:
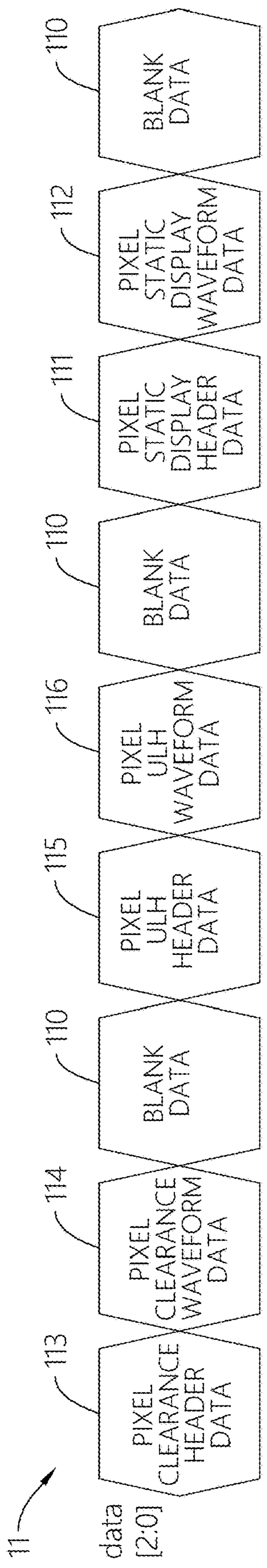
FIG. 15A is a perspective view of the data signal outputted by the at least one data signal output port of the multistable display of the present invention.
Figure 15B:
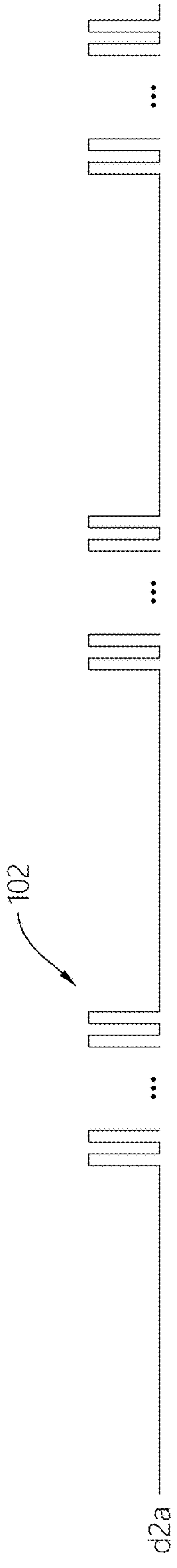
FIG. 15B is a perspective view of a conversion control signal outputted by a digital to analog (d2a) control port of the multistable display of the present invention.

Furthermore, the data signal 11 also includes a plurality of blank data 110. With reference to FIGS. 15A and 15B, one of the blank data 110 may be placed between the pixel clearance waveform data 114 and the pixel ULH header data 115, another one of the blank data 110 may be placed between the pixel ULH waveform data 116 and the pixel static display header data 111, and the other one of the blank data 110 may be placed after the pixel static display waveform data 112.

In the present embodiment, the driver circuit 20 includes the duty count. When the data signal 11 is the blank data, the digital to analog (d2a) control port outputs a conversion control signal having a plurality of counting signals 102, and a number of counting signals 102 is even multiples of the duty count. For example, the number of counting signals 102 outputted from the digital to analog (d2a) control port equals 2-folds the duty count.

Further, when the data signal 11 is the pixel static display waveform data 112, the digital to analog (d2a) control port also outputs the plurality of counting signals 102, and the number of counting signals 102 is even multiples of the duty count. For example, the number of counting signals 102 outputted from the digital to analog (d2a) control port equals 2-folds the duty count.

Figure 16:
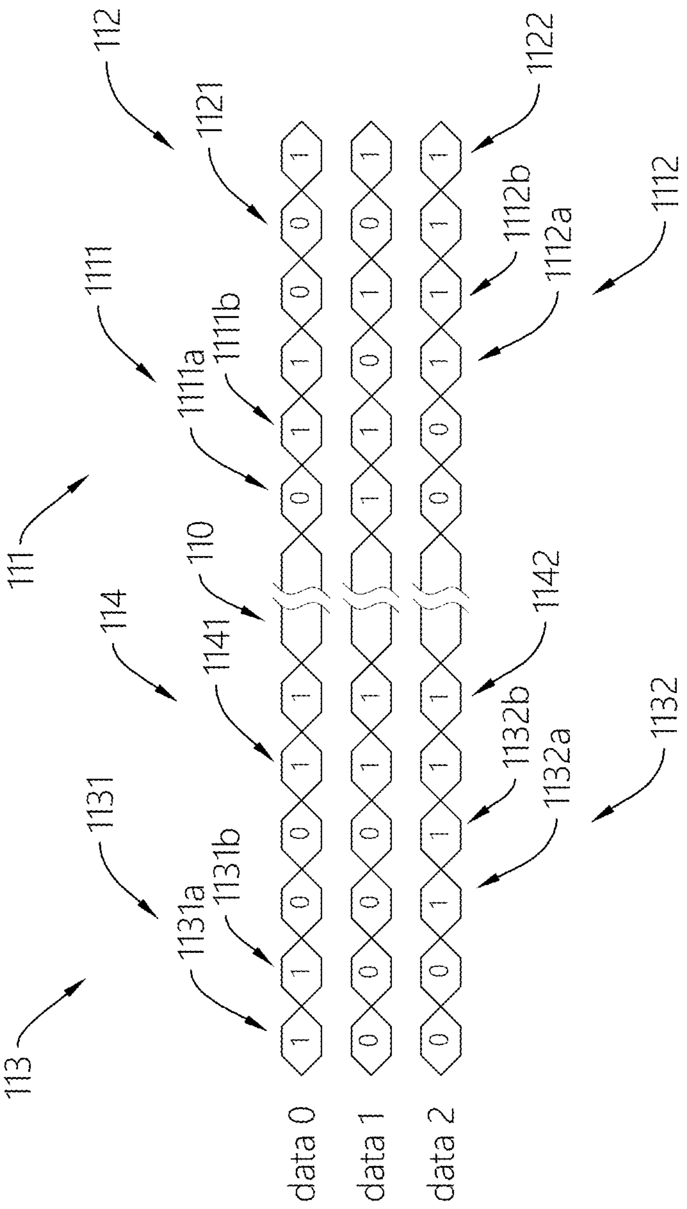
FIG. 16 is a perspective view of the data signal outputted by first to third data output ports (data 0 to data 2) of the multistable display of the present invention.

With reference to FIG. 16, in the present embodiment, the pixel clearance header data 113 includes a pixel clearance positive voltage information 1131 and a pixel clearance negative voltage information 1132. The pixel clearance positive voltage information 1131 further includes a first pixel clearance positive voltage value 1131*a* and a second pixel clearance positive voltage value 1131*b*. The pixel 15 clearance negative voltage information 1132 further includes a first pixel clearance negative voltage value 1132*a* and a second pixel clearance negative voltage value 1132*b*. In the present embodiment, the first pixel clearance positive voltage value 1131*a* is a first set of values outputted from the first to the third data output ports (data 0 to data 2), and the first pixel clearance positive voltage value 1131*a* is presented in 3 bits binary code, respectively as V1(0) to V1(2), for corresponding to a first voltage V1, i.e. corresponding to "001". The second pixel clearance positive voltage value 1131*b* is a second set of values outputted from the first to the third data output ports (data 0 to data 2), and the second pixel clearance positive voltage value 1131*b* is also presented in 3 bits binary code, for corresponding to the first voltage V1, i.e. corresponding to "001". Similarly, the first pixel clearance negative voltage value 1132*a* is a third set of values outputted from the first to the third data output ports (data 0 to data 2), and the first pixel clearance negative voltage value 1132*a* is presented in 3 bits binary code, respectively as V4(0) to V4(2), for corresponding to a fourth voltage V4, i.e. corresponding to "100". The second pixel clearance negative voltage value 1132*b* is a fourth set of values outputted from the first to the third data output ports (data 0 to data 2), and the second pixel clearance negative voltage value 1132*b* is also presented in 3 bits binary code, for corresponding to the fourth voltage V4, i.e. corresponding to "100".

The pixel clearance waveform data 114 includes a plurality of pixel electrode clearance information (1141 to 114*n*). The pixel electrode clearance information (1141 to 114*n*) at least includes a first pixel electrode clearance information 1141, and the first pixel electrode clearance information 1141 includes a first clearance voltage duty number. In the present embodiment, the first clearance voltage duty number is taken from the first to the third data output ports (data 0 to data 2), and the first clearance voltage duty number is represented in 3 bits binary code, respectively as pixel 1(0) to pixel 1(2), for corresponding to the first pixel electrode. For example, the first pixel electrode clearance information 1141 is "111". The pixel electrode clearance information (1141 to 114*n*) also includes the second to the $n^{th}$ pixel electrode clearance information (1142 to 114*n*), and the second to the $n^{th}$ pixel electrode clearance information (1142 to 114*n*) respectively includes a second clearance voltage duty number to an $n^{th}$ clearance voltage duty number. Similarly, the second clearance voltage duty number is taken from the first to the third data output ports (data 0 to data 2), and the second clearance voltage duty number is represented in 3 bits binary code, respectively as pixel 2(0) to pixel 2(2), for corresponding to a second pixel electrode. For example, the second pixel electrode clearance information 1142 is "110".

Furthermore, when the driver circuit 20 determines the pixel clearance driving time duration, for outputting the pixel clearance driver signal with the pixel clearance voltage value, according to the pixel clearance waveform data 114, the driver circuit 20 outputs the pixel clearance driver signal with the first pixel clearance positive voltage value to the first pixel electrode for a time when the driver circuit 20 receives a $1^{st}$ counting signal 102 to an "$A^{th}$" counting signal 102 outputted from the digital to analog (d2a) control port. The driver circuit 20 outputs the pixel clearance driver signal with the second pixel clearance positive voltage value to the first pixel electrode for a time when the driver circuit 20 receives an "$(A+1)^{th}$" counting signal 102 to a "$B^{th}$" counting signal 102 outputted from the digital to analog (d2a) control port. The driver circuit 20 further outputs the pixel clearance driver signal with the first pixel clearance negative voltage value to the first pixel electrode for a time when the driver circuit 20 receives a "$(B+1)^{th}$" counting signal 102 to an "$(A+B)^{th}$" counting signal 102 outputted from the digital to analog (d2a) control port. The driver circuit 20 outputs the pixel clearance driver signal with the second pixel clearance negative voltage value to the first pixel electrode for a time when the driver circuit 20 receives an "$(A+B+1)^{th}$" counting signal 102 to a "$(2B)^{th}$" counting signal 102 outputted from the digital to analog (d2a) control port. In the embodiment, "A" is the first clearance voltage duty number, and "B" is the duty count.

The pixel static display header data 111 includes a pixel display positive voltage information 1111 and a pixel display negative voltage information 1112. The pixel display positive voltage information 1111 further includes a first pixel display positive voltage value 1111*a* and a second pixel display positive voltage value 1111*b*. The pixel display negative voltage information 1112 further includes a first pixel display negative voltage value 1112*a* and a second pixel display negative voltage value 1112*b*. In the present embodiment, the time controller circuit 10 includes the first data output port (data 0) to the third data output port (data 2). The first pixel display positive voltage value 1111*a* is outputted from the first to the third data output ports (data 0 to data 2), and the first pixel display positive voltage value 1111*a* is presented in 3 bits binary code, respectively as V2(0) to V2(2), for corresponding to a second voltage V2, i.e. "010". The second pixel display positive voltage value 1111*b* is outputted from the first to the third data output ports (data 0 to data 2), and the second pixel display positive voltage value 1111*b* is also presented in 3 bits binary code, respectively as V3(0) to V3(2), for corresponding to a third voltage V3, i.e. "011". Similarly, the first pixel display negative voltage value 1112*a* is outputted from the first to the third data output ports (data 0 to data 2), and the first pixel display negative voltage value 1112*a* is presented in 3 bits binary code, respectively as V5(0) to V5(2), for corresponding to a fifth voltage V5, i.e. "101". The second pixel display negative voltage value 1112*b* is outputted from the first to the third data output ports (data 0 to data 2), and the second pixel display negative voltage value 1112*b* is also presented in 3 bits binary code, respectively as V6(0) to V6(2), for corresponding to a sixth voltage V6, i.e. "110".

The pixel static display waveform data 112 includes a plurality of pixel electrode display information (1121 to 112*n*). The pixel electrode display information (1121 to 112*n*) at least includes a first pixel electrode display information 1121, and the first pixel electrode display information 1121 includes a first display voltage duty number. In the present embodiment, the first display voltage duty number includes numbers taken from the first to the third data output ports (data 0 to data 2), and the first display voltage duty number is represented in 3 bits binary code, respectively as pixel 1(0) to pixel 1(2), for corresponding to a first pixel electrode. For example, the first display voltage duty number of the first pixel electrode display information 1121 is "100". The pixel electrode display information (1121 to 112*n*) also includes the second to the $n^{th}$ pixel electrode display information (1122 to 112*n*), and the second to the $n^{th}$ pixel electrode display information (1122 to 112*n*) respectively includes a second display voltage duty number to an $n^{th}$ display voltage duty number. Similarly, the second display voltage duty number includes numbers taken from the first to the third data output ports (data 0 to data 2), and the second display voltage duty number is represented in 3 bits binary code, respectively as pixel 2(0) to pixel 2(2), for corresponding to the second pixel electrode. For example, the second display voltage duty number of the second pixel electrode display information 1122 is "111".

When the driver circuit 20 determines the pixel display driving time duration, for outputting the pixel display driver signal with the pixel display voltage value, according to the pixel static display waveform data 112, the driver circuit 20 outputs the pixel display driver signal with the first pixel display positive voltage value to the first pixel electrode for a time when the driver circuit 20 receives a $1^{st}$ counting signal 102 to a "$C^{th}$" counting signal 102 outputted from the digital to analog (d2a) control port. The driver circuit 20 outputs the pixel display driver signal with the second pixel display positive voltage value to the first pixel electrode for a time when the driver circuit 20 receives a "$(C+1)^{th}$" counting signal 102 to a "$B^{th}$" counting signal 102 outputted from the digital to analog (d2a) control port. Moreover, the driver circuit 20 outputs the pixel display driver signal with the first pixel display negative voltage value to the first pixel electrode for a time when the driver circuit 20 receives a "$(B+1)^{th}$" counting signal 102 to a "$(B+C)^{th}$" counting signal 102 outputted from the digital to analog (d2a) control port. The driver circuit 20 outputs the pixel display driver signal with the second pixel display negative voltage value to the first pixel electrode for a time when the driver circuit 20 receives a "$(B+C+1)^{th}$" counting signal 102 to a "$(2B)^{th}$" counting signal 102 outputted from the digital to analog (d2a) control port. In the embodiment, "C" is the first display voltage duty number, and "B" is the duty count.

For example, the duty count is configured to be an integer 7. As shown for the first pixel electrode clearance information 1141, the first clearance voltage duty number is "111". As shown for the second pixel electrode clearance information 1142, the second clearance voltage duty number is "111". As shown for the first pixel clearance positive voltage value 1131*a*, the first pixel clearance positive voltage value is the first voltage V1, i.e. "001". As shown for the second pixel clearance positive voltage value 1131*b*, the second pixel clearance positive voltage value is the first voltage V1, i.e. "001". As shown for the first pixel clearance negative voltage value 1132*a*, the first pixel clearance negative voltage value is the fourth voltage V4, i.e. "100". As shown for the second pixel clearance negative voltage value 1132*b*, the second pixel clearance negative voltage value is the fourth voltage V4, i.e. "100". As shown for the first pixel electrode display information 1121, the first display voltage duty number is "100". As shown for the second pixel electrode display information 1122, the second display voltage duty number is "111". As shown for the first pixel display positive voltage value 1111*a*, the first pixel display positive voltage value is the second voltage V2, i.e. "010". As shown for the second pixel display positive voltage value 1111*b*, the second pixel display positive voltage value is the third voltage V3, i.e. "011". As shown for the first pixel display negative voltage value 1112*a*, the first pixel display negative voltage value is the fifth voltage V5, i.e. "101". As shown for the second pixel display negative voltage value 1112*b*, the second pixel display negative voltage value is the sixth voltage V6, i.e. "110".

Figure 17A:
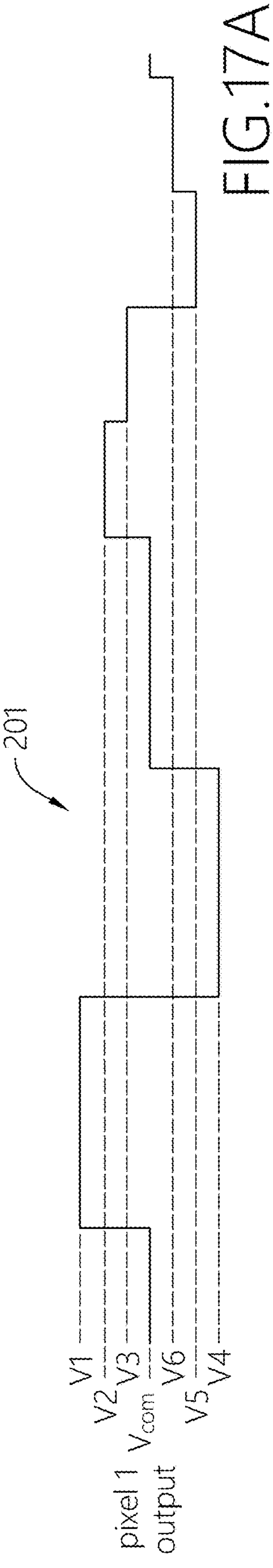
FIG. 17A is a waveform perspective view of the pixel driver signal outputted from the driver circuit to the first pixel electrode in the multistable display of the present invention.
Figure 17B:
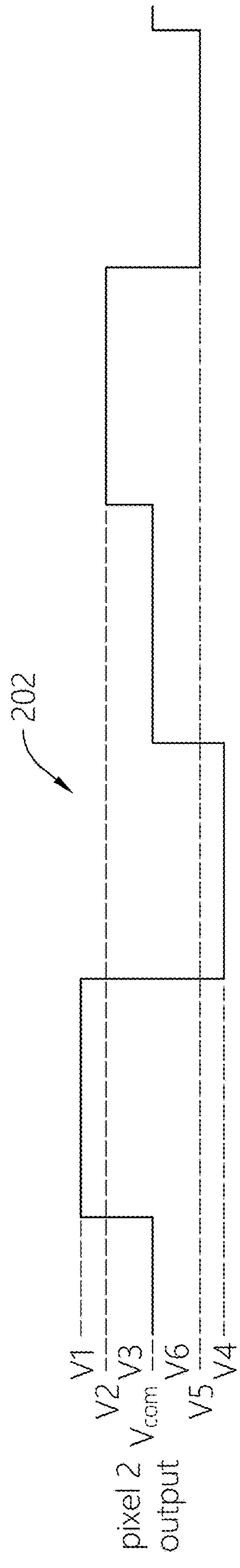
FIG. 17B is a waveform perspective view of the pixel driver signal outputted from the driver circuit to the second pixel electrode in the multistable display of the present invention.
Figure 17C:
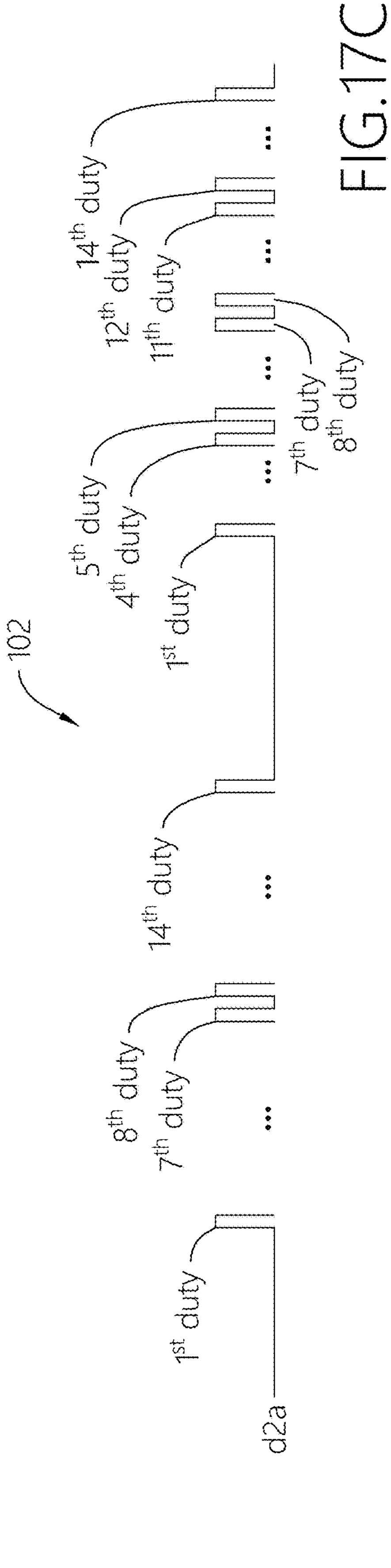
FIG. 17C is a perspective view of the conversion control signal outputted by the d2a control port of the multistable display of the present invention.

With further reference to FIGS. 17A to 17C, as the first clearance voltage duty number is "111", the driver circuit 20 outputs the pixel clearance driver signal with the first pixel clearance positive voltage value, i.e. the first voltage V1, to the first pixel electrode for the first clearance time duration of 7 clocks of duty time. For this reason, the driver circuit 20 outputs the pixel clearance driver signal with the first pixel clearance positive voltage value, i.e. the first voltage V1, to the first pixel electrode for a time when the driver circuit 20 receives a $1^{st}$ to a $7^{th}$ counting signal 102 outputted from the digital to analog control port (d2a). Moreover, the driver circuit 20 outputs the pixel clearance driver signal with the second pixel clearance positive voltage value to the first pixel electrode for a time when the driver circuit 20 receives an "$(A+1)^{th}$" to a "$B^{th}$" counting signal 102 outputted from the digital to analog (d2a) control port. However, since the first clearance voltage duty number is 7, such as A=7, and the duty count is 7, such as B=7, the first clearance voltage duty number (A) plus one is greater than the duty count (B). Namely, A (first clearance voltage duty number)+1=7+1=8>7=B (duty count). Therefore, the driver circuit 20 does not output the pixel clearance driver signal with the second pixel positive clearance voltage value, such as the first voltage V1, to the first pixel electrode.

As the driver circuit 20 enters the negative half cycle, the driver circuit 20 outputs the pixel clearance driver signal with the first pixel clearance negative voltage value, i.e. the fourth voltage V4, to the first pixel electrode for a time when the driver circuit 20 receives an $8^{th}$ to a $14^{th}$ counting signal 102 outputted from the digital to analog (d2a) control port. Moreover, the driver circuit 20 outputs the pixel clearance driver signal with the second pixel clearance negative voltage value to the first pixel electrode for a time when the driver circuit 20 receives an "$(A+B+1)^{th}$" to a "$(2B)^{th}$" counting signal 102 outputted from the digital to analog (d2a) control port. However, since the first clearance voltage duty number is 7, such as A=7, and the duty count is 7, such as B=7, the first clearance voltage duty number (A) plus the duty count (B) and one is greater than double of the duty count (2B). Namely, A (first clearance voltage duty number)+B (duty count)+1=7+7+1=15>2×7=14=2B (double of duty count). Therefore, the driver circuit 20 does not output the pixel clearance driver signal with the second pixel negative clearance voltage value, such as the fourth voltage V4, to the first pixel electrode.

The driver circuit 20 outputs the pixel clearance driver signal to the second pixel electrode following a similar logic to the above mentioned way of outputting the pixel clearance driver signal to the first pixel electrode, and therefore, further description of the driver circuit outputting the pixel clearance driver signal to the second pixel electrode is omitted.

As the first display voltage duty number is "100", the driver circuit 20 outputs the pixel display driver signal with the first pixel display positive voltage value, i.e. the second voltage V2, to the first pixel electrode for the first display time duration of 6 clocks of duty time. For this reason, the driver circuit 20 outputs the pixel display driver signal with the first pixel display positive voltage value, i.e. the second voltage V2, to the first pixel electrode for a time when the driver circuit 20 receives a $1^{st}$ to a $4^{th}$ counting signal 102 outputted from the digital to analog (d2a) control port. Moreover, the driver circuit 20 outputs the pixel display driver signal with the second pixel display positive voltage value, i.e. the third voltage V3, to the first pixel electrode for a time when the driver circuit 20 receives a $5^{th}$ to a $7^{th}$ counting signal 102 outputted from the digital to analog (d2a) control port.

As the driver circuit 20 enters the negative half cycle, the driver circuit 20 outputs the pixel display driver signal with the first pixel display negative voltage value, i.e. the fifth voltage V5, to the first pixel electrode for a time when the driver circuit 20 receives an $8^{th}$ to an 11th counting signal 102 outputted from the digital to analog (d2a) control port. Moreover, the driver circuit 20 outputs the pixel display driver signal with the second pixel display negative voltage value, i.e. the sixth voltage V6, to the first pixel electrode for a time when the driver circuit 20 receives a 12th to a $14^{th}$ counting signal 102 outputted from the digital to analog (d2a) control port.

With similar logics, as the second display voltage duty number is "111", the driver circuit 20 outputs the pixel display driver signal with the first pixel display positive voltage value, i.e. the second voltage V2, to the second pixel electrode for a time when the driver circuit 20 receives a $1^{st}$ to a $7^{th}$ counting signal 102 outputted from the digital to analog (d2a) control port. However, since the duty count is 7, the driver circuit 20 enters the negative half cycle after the driver circuit 20 receives the $7^{th}$ counting signal 102, and the driver circuit 20 does not output the pixel display driver signal with the second pixel display positive voltage value, i.e. the third voltage V3, to the second pixel electrode.

As the driver circuit 20 enters the negative half cycle, the driver circuit 20 outputs the pixel display driver signal with the first pixel display negative voltage value, i.e. the fifth voltage V5, to the second pixel electrode for a time when the driver circuit 20 receives an $8^{th}$ to a $14^{th}$ counting signal 102 outputted from the digital to analog (d2a) control port. Moreover, since double of the duty count is 14, a period of the pixel display driver signal is ended after the driver circuit 20 receives the $14^{th}$ counting signal 102, and the driver circuit 20 does not output the pixel display driver signal with the second pixel display negative voltage value, i.e. the sixth voltage V6, to the second pixel electrode.

With reference to FIGS. 17A and 17B, FIG. 17A presents a waveform perspective view of a first pixel display driver signal 201 outputted from the driver circuit 20 to the first pixel electrode, and FIG. 17B presents a waveform perspective view of a second pixel display driver signal 202 outputted from the driver circuit 20 to the second pixel electrode.

In an example, the multistable display driven by CDS is configured to display Full HD resolution of 1920×1080. When using single data rate (SDR) for transporting data, each cycle of the clock signal is able to include and transport data for one pixel, thus in other words, the pixel per clock is 1. Furthermore, a transportation time ($T_{line}$) for each frame is configured to be 5 milliseconds (ms).

A clock rate of the multistable display driven by CDS is calculated with the following formula:

$$\text{clock rate (Hz)} = \frac{\text{(resolution)}}{\text{(piexl per clock)}} \times \frac{1}{(T_{line})}$$

More particularly, when the resolution is 1920, the pixel per clock under SDR is 1, and the transportation time ($T_{line}$) is configured as 5 ms, the clock rate is obtained as shown in the following Table 3:

TABLE 3

| Resolution | Mode | Pixel per clock | Duty count | $T_{line}$ | Clock rate |
|---|---|---|---|---|---|
| Full HD (1920 ×1080) | SDR | 1 | 64 | 5 (ms) | 384.8 (kHz) |

Comparing Table 1 and Table 3, the clock rate of the multistable display driven by CDS is lower than a clock rate of the conventional multistable display, and thus the multistable display of the present invention is able to decrease power consumption.

Overall, as clock rate and duty count are independent from each other in the present invention, the clock rate of the multistable display driven by CDS, under a same condition of having $T_{line}$=5 ms, is significantly reduced to kHz levels. In other words, the multistable display driven by CDS of the present invention is able to be driven at a low clock rate, thus allowing the multistable display of the present invention to reduce its power consumption rate.

Furthermore, to configure all voltages and voltage waveforms needed across multiple duty cycles for updating a frame, the multistable display of the present invention merely requires to transport data once, instead of needing to transport data multiple times for configuring various voltages across different duty cycles. In other words, by transporting the pixel static display header data 111 and the pixel static display waveform data 112 in the data signal 11 at once, the time controller circuit 10 is able to instruct the driver circuit 20 to configure all voltages and voltage waveforms needed across multiple duty cycles for updating a frame. Each of the display start pulse (dsp) control ports only needs to output for one duty cycle, instead of needing to output for multiple duty cycles for configuring all voltages and voltage waveforms needed across multiple duty cycles for updating a frame. As such, the present invention drastically decreases a number of times, or duty cycles, the display start pulse (dsp) control ports needed to output signals, thus decreasing a power consumption for statically switching voltages being output by the display start pulse (dsp) control ports.

Furthermore, since the counting signals 102 outputted from the digital to analog (d2a) control port are utilized for calculations, during a hold time of the digital to analog (d2a) control port outputting the counting signals 102, the at least one data signal output port would still be able to transport data and stay unaffected by signal conversions between digital signals and analog signals, thus, preventing data bubble from forming. In other words, during a hold time of the digital to analog (d2a) control port outputting the counting signals 102, the data signal output port (data 0) continues to transport data, and as the data transmission is continuous without stopping, data bubble is prevented from forming. As a result, the present invention is able to more efficiently transport data for updating a frame.

As the counting signals 102 outputted from the digital to analog (d2a) control port are utilized for calculations, waveform data for a first frame is required to finish its data transportation before a first counting signal arrives, i.e. before the counting signals 102 rise to a higher voltage level for the first time. Subsequently, a next frame's waveform data may be transported during a time period from an arrival of the second counting signal to an arrival of the $n^{th}$ counting signal. The next frame's waveform data should finish its data transportation before an $(n+1)^{th}$ counting signal arrives. For example, suppose that a frame's voltage waveform occupies 4 duties, the at least one data signal output port needs to finish transporting a first frame's voltage waveform before the first counting signal arrives with a rise of voltage level. Subsequently, a second frame's voltage waveform may be transported during the time period from the arrival of a second counting signal to the arrival of a fourth counting signal, and the second frame's voltage waveform should finish its data transportation before a fifth counting signal arrives. A buffer time may be included between transporting waveform data of two consecutive frames, and thus, meaning the transporting of the waveform data of two consecutive frames is free to be spaced apart by the buffer time, instead of being forced to be bundled together during data transportation. As such, the present invention provides and ensures great flexibility for sequencing the transportation of the waveform data of two consecutive frames.

A plurality of digital to analog (d2a) control ports of a conventional multistable display are utilized to output signals for digital to analog conversion. For updating a frame, within each duty, the digital to analog (d2a) control ports of the conventional multistable display are required to output signals for a cycle, and only when the digital to analog (d2a) control ports outputted the signals for a cycle would the at least one data signal output port output a waveform data for a next duty. This process is repeated until a last duty's waveform data is outputted. Furthermore, once the last duty's waveform data is outputted for updating a last frame, the digital to analog (d2a) control ports are further required to output for one more cycle of signals, and only then would the at least one data signal output port stop outputting the waveform data. In other words, the at least one data signal output port of the conventional multistable display would only stop outputting waveform data after the digital to analog (d2a) control ports of the conventional multistable display has outputted its last signals.

However, the multistable display driven by CDS of the present invention is different. The counting signals 102 outputted by the digital to analog control port (d2a) of the present invention are utilized for counting, and the at least one data signal output port of the present invention only needs to finish transporting the waveform data before the first counting signal arrives with a rising voltage. As a result, once the waveform data for the last frame is outputted, the at least one data signal output port of the present invention no longer needs to output more waveform data. In other words, once the waveform data for the last frame is outputted, for a time duration of the digital to analog control port (d2a) of the present invention outputting the counting signals 102, the at least one data signal output port no longer needs to output more waveform data. For example, suppose that a last frame's voltage waveform occupies 4 duties, the at least one data signal output port needs to finish transporting the last frame's voltage waveform before the first counting signal arrives with a rise of voltage level. For a time duration of the digital to analog control port (d2a) of the present invention outputting the first counting signal to the fourth counting signal for the last frame, the at least one data signal output port no longer needs to output more waveform data.

Furthermore, according to the aforementioned embodiments, the driver circuit 20 determines the pixel display voltage value of the pixel display driver signal outputted from the driver circuit 20 to the screen 30 according to the pixel static display header data 111, and the driver circuit 20 also determines the pixel display driving time duration for outputting the pixel display driver signal with the pixel display voltage value from the driver circuit 20 to the screen 30 according to the pixel static display waveform data 112. More particularly, when the driver circuit 20 determines the pixel display driving time duration for outputting the pixel display driver signal with the pixel display voltage value according to the pixel static display waveform data 112, the driver circuit 20 determines the display voltage duty number according to the pixel static display waveform data 112, then the driver circuit 20 configures the first display time duration for outputting the first pixel display positive voltage value or the first pixel display negative voltage value according to the display voltage duty number. Further, the driver circuit 20 configures the second display time duration for outputting the second pixels display positive voltage value or the second pixel display negative voltage value according to the duty count minus the display voltage duty number. In other words, the pixel static display waveform data 112 corresponds to hold time for each voltage value. As the driver circuit 20 receives the pixel static display waveform data 112, the driver circuit 20 counts the number of counting signals 102 outputted from the digital to analog (d2a) control port according to the pixel static display waveform data 112 for calculating the pixel display driving time duration for outputting the pixel display driver signal with the pixel display voltage value. As a result, the driver circuit 20 is able to determine entire waveforms of the pixel display driver signal for each of the pixels by only obtaining the pixel static display waveform data 112, and thus, the present invention drastically decreases an amount of data needed to be transported for updating a frame.

Furthermore, since the time controller circuit 10 only starts outputting signal from the display start pulse (dsp) control ports, for controlling the driver circuit 20 to output the line driving signals, when the time controller circuit 10 finishes outputting the pixel clearance header data and the pixel clearance waveform data, the time controller circuit 10 does not need to provide any additional data to the driver circuit 20 during a time when the driver circuit 20 is outputting the pixel clearance positive voltage information and the pixel clearance negative voltage information or when the driver circuit 20 is operated in a uniform lying helix (ULH) stable mode.

Figure 18:
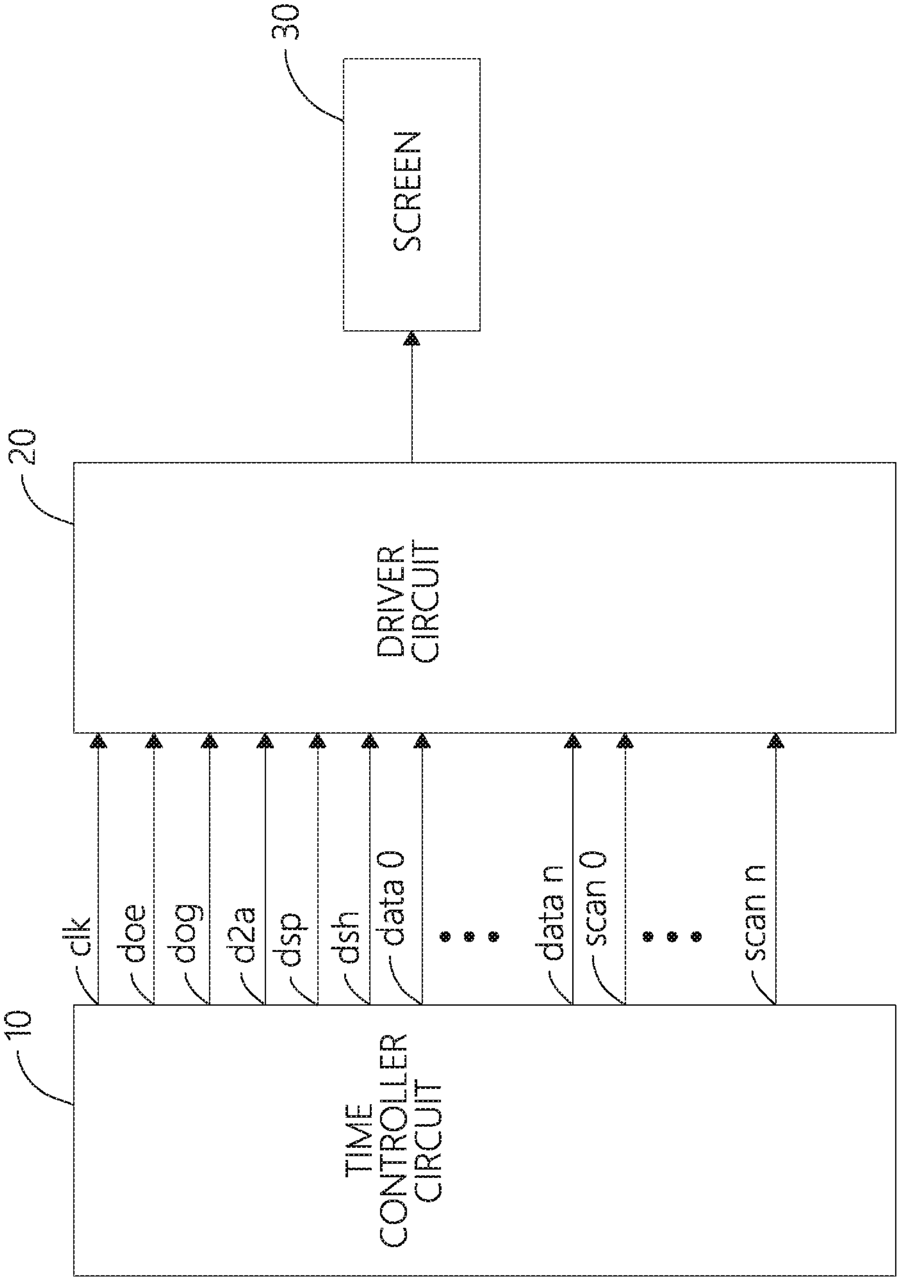
FIG. 18 is another block diagram of the multistable display of the present invention.

With reference to FIG. 18, the time controller circuit 10 further includes at least one scanning output port. In other embodiments, the at least one scanning output port of the time controller circuit 10 may include a plurality of scanning output ports (scan 0 to scan n), such as the first scanning output port (scan 0) to the $(n+1)^{th}$ scanning output port (scan n), wherein n is free to be any positive integers. In the present embodiment, the time controller circuit 10 includes the first scanning output port (scan 0) to the third scanning output port (scan 2).

Figures 19A, 19B, 19C:
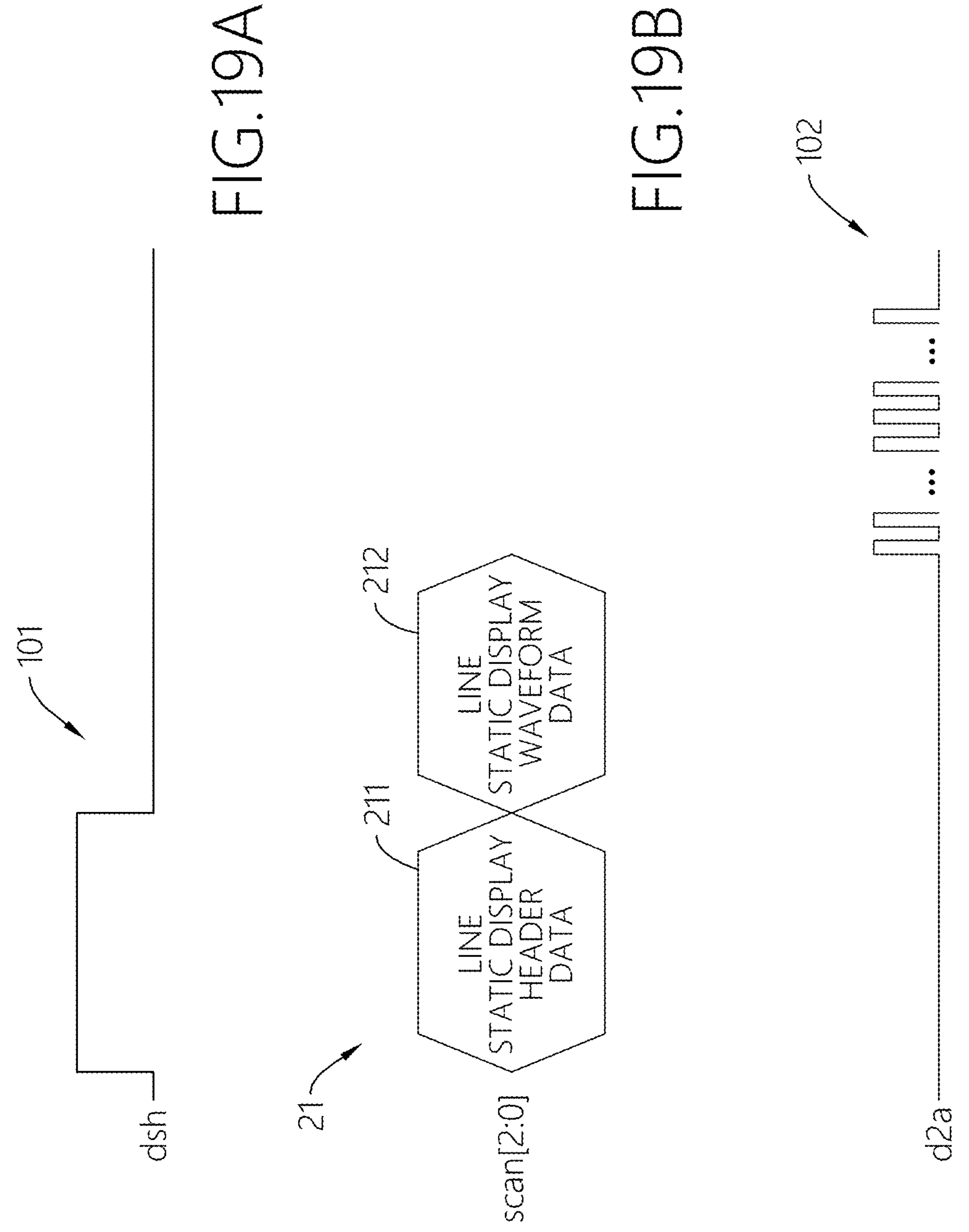
FIG. 19A is a waveform perspective view of the header setting signal outputted by the dsh control port of the multistable display of the present invention.
FIG. 19B is a perspective view of a scan signal outputted by a scan signal output port of the multistable display of the present invention.
FIG. 19C is a perspective view of the conversion control signal outputted by the d2a control port of the multistable display of the present invention.

With reference to FIGS. 19A to 19C, the time controller signal includes a scan signal 21, and the scan signal 21 includes a line static display header data 211 and a line static display waveform data 212. Before the driver circuit 20 outputs a line driving signal to the screen 30, the driver circuit 20 determines a line driving voltage value of the line driving signal according to the line static display header data 211, and the driver circuit 20 also determines a waveform of the line driving signal according to the line driving voltage value and the line static display waveform data 212.

Figure 20A:
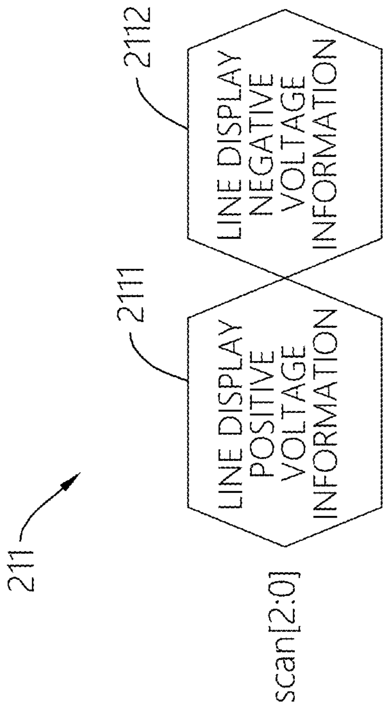
FIG. 20A is a perspective view of a line static display header data of the scan signal outputted by the scan signal output port of the multistable display of the present invention.
Figure 20B:
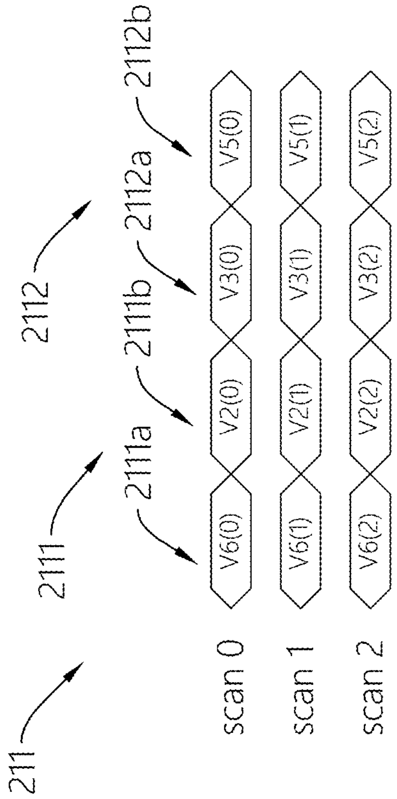
FIG. 20B is a perspective view of the line static display header data of the scan signal outputted by first to third scanning output ports (scan 0 to scan 2) of the multistable display of the present invention.
Figure 22:
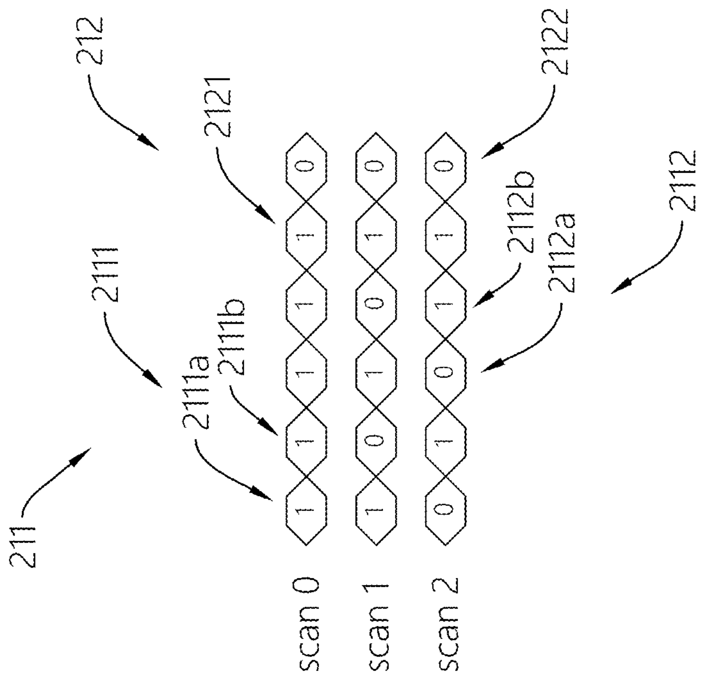
FIG. 22 is a perspective view of the scan signal outputted by first to third scanning output ports (scan 0 to scan 2) of the multistable display of the present invention.

With reference to FIGS. 20A and 20B, for example, the line static display header data 211 at least include a line display positive voltage information 2111 and a line display negative voltage information 2112. In the present embodiment, the time controller circuit 10 includes the first scanning output port (scan 0) to the third scanning output port (scan 2). The line display positive voltage information 2111 includes a first line display positive voltage value 2111*a* and a second line display positive voltage value 2111*b*. The first line display positive voltage value 2111*a* is a combination of data from the first scanning output port (scan 0) to the third scanning output port (scan 2), i.e. V6(0) to V6(2) that corresponds to the sixth voltage V6. For example, with reference to FIG. 22, the first line display positive voltage value 2111*a* is 110. Similarly, the second line display positive voltage value 2111*b* is represented as V2(0) to V2(2) which corresponds to the second voltage V2. For example, with reference to FIG. 22, the second line display positive voltage value 2111*b* is 010. The line display negative voltage information 2112 includes a first line display negative voltage value 2112*a* and a second line display negative voltage value 2112*b*. The first line display negative voltage value 2112*a* is represented as V3(0) to V3(2) which corresponds to the third voltage V3. For example, with reference to FIG. 22, the first line display negative voltage value 2112*a* is 011. The second line display negative voltage value 2112*b* is represented as V5(0) to V5(2) which corresponds to the fifth voltage V5. For example, with reference to FIG. 22, the second line display negative voltage value 2112*b* is 101.

Figure 21A:
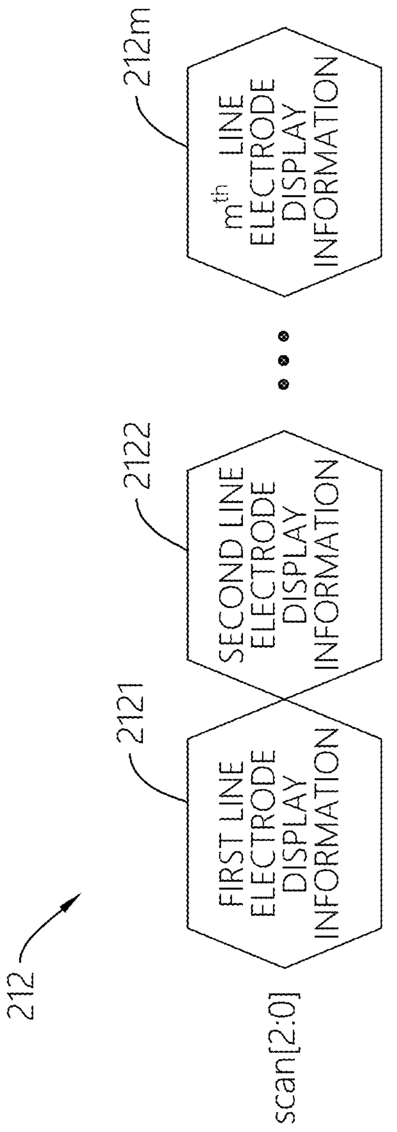
FIG. 21A is a perspective view of a line static display waveform data of the scan signal outputted by the scan signal output port of the multistable display of the present invention.
Figure 21B:
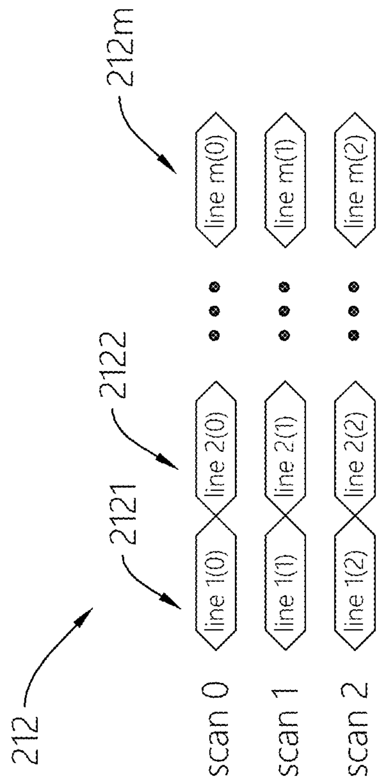
FIG. 21B is a perspective view of the line static display waveform data of the scan signal outputted by first to third scanning output ports (scan 0 to scan 2) of the multistable display of the present invention.

With reference to FIGS. 21A and 21B, the line static display waveform data 212 includes a plurality of line electrode display information (2121 to 212*m*), and the line electrode display information (2121 to 212*m*) at least includes a first line electrode display information 2121. The first line electrode display information 2121 includes a waveform information of the line driving signal for the first line electrode. The second line electrode display information 2122 includes a waveform information of the line driving signal for the second line electrode. In the present embodiment, the first line electrode display information 2121 is combination taken from the first to the third scanning output ports (scan 0 to scan 2). For example, with reference to FIG. 22, the first line electrode display information 2121 is 111. The second line electrode display information 2122 is also a combination taken from the first to the third scanning output ports (scan 0 to scan 2). For example, with reference to FIG. 22, the second line electrode display information 2122 is 000.

Figures 23A, 23B, 23C:
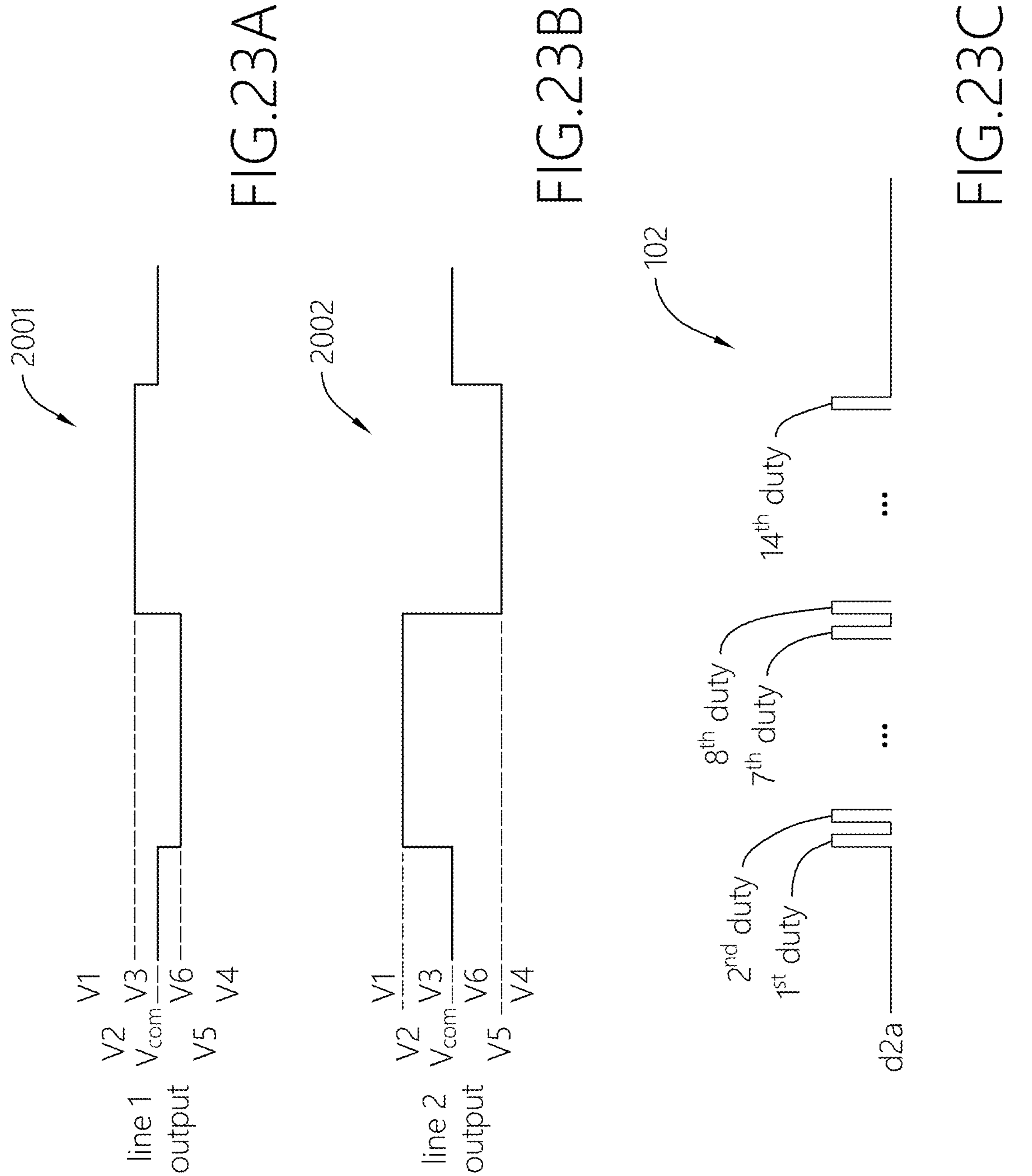
FIG. 23A is a waveform perspective view of a line driver signal outputted from the driver circuit to a first line electrode in the multistable display of the present invention.
FIG. 23B is a waveform perspective view of the line driver signal outputted from the driver circuit to a second line electrode in the multistable display of the present invention.
FIG. 23C is a perspective view of the conversion control signal outputted by the d2a port of the multistable display of the present invention.

With reference to FIGS. 23A to 23C, before the driver circuit 20 outputs a first line driving signal 2001 to the first line electrode, the driver circuit 20 determines a waveform of the line driving signal 2001 according to the first line electrode display information 2121. For example, the first line electrode display information 2121 is "111", and according to the first line electrode display information 2121, the driver circuit 20 determines that the waveform of the first line driving signal 2001 corresponds to first outputting the sixth voltage V6 to the first line electrode and then outputting the third voltage V3 to the first line electrode, and a time duration for outputting the sixth voltage V6 to a time duration for outputting the third voltage V3 is 1:1. For example, the waveform of the first line driving signal 2001 outputted from the driver circuit 20 to the screen 30 is shown in FIG. 23A. The driver circuit 20 outputs the line driving signal with the sixth voltage V6 to the first line electrode during a time when the digital to analog (d2a) control port outputs the $1^{st}$ to the $7^{th}$ counting signals 102, and then the driver circuit 20 outputs the line driving signal with the third voltage V3 to the first line electrode during a time when the digital to analog (d2a) control port outputs the $8^{th}$ to the $14^{th}$ counting signals 102.

Before the driver circuit 20 outputs a second line driving signal 2002 to the second line electrode, the driver circuit 20 determines a waveform of the line driving signal 2002 according to the second line electrode display information 2122. For example, the second line electrode display information 2122 is "000", and according to the second line electrode display information 2122, the driver circuit 20 determines that the waveform of the second line driving signal 2002 corresponds to first outputting the second voltage V2 to the second line electrode and then outputting the fifth voltage V5 to the second line electrode, and a time duration for outputting the second voltage V2 to a time duration for outputting the fifth voltage V5 is 1:1. For example, the waveform of the second line driving signal 2002 outputted from the driver circuit 20 to the screen 30 is shown in FIG. 23B. The driver circuit 20 outputs the second line driving signal 2002 with the second voltage V7 to the second line electrode during a time when the digital to analog (d2a) control port outputs the $1^{st}$ to the $7^{th}$ counting signals 102, and then the driver circuit 20 outputs the second line driving signal 2002 with the fifth voltage V5 to the second line electrode during a time when the digital to analog (d2a) control port outputs the $8^{th}$ to the $14^{th}$ counting signals 102.

What is claimed is:

1. A multistable display driven by static display switch (CDS), comprising:

a time controller circuit, generating a time controller signal;

a driver circuit, connected to the time controller circuit, and receiving the time controller signal; and a screen, connected to the time controller circuit;

wherein the time controller signal comprises a data signal, and the data signal comprises a pixel static display header data and a pixel static display waveform data;

wherein the driver circuit determines a pixel display voltage value of a pixel display driver signal according to the pixel static display header data, and the driver circuit determines a pixel display driving time duration according to the pixel static display waveform data;

wherein the driver circuit outputs the pixel display driver signal with the pixel display voltage value to the screen for the pixel display driving time duration;

wherein the data signal further comprises a pixel clearance header data; and wherein the driver circuit determines a pixel clearance driver signal according to the pixel clearance header data, and the driver circuit outputs the pixel clearance driver signal to the screen.

2. The multistable display as claimed in claim 1, wherein the data signal further comprises a pixel clearance header data and a pixel uniform lying helix (ULH) header data;

wherein the driver circuit determines a pixel clearance driver signal according to the pixel clearance header data, and the driver circuit outputs the pixel clearance driver signal to the screen;

wherein the driver circuit determines a pixel ULH driver signal according to the pixel ULH header data, and the driver circuit outputs the pixel ULH driver signal to the screen.

3. The multistable display as claimed in claim 1, wherein the data signal further comprises a pixel clearance header data and a pixel clearance waveform data;

wherein the driver circuit determines a pixel clearance voltage value for a pixel clearance driver signal according to the pixel clearance header data, the driver circuit determines a pixel clearance driving time duration for outputting the pixel clearance driver signal according to the pixel clearance waveform data, and the driver circuit outputs the pixel clearance driver signal with the pixel clearance voltage value for the pixel clearance driving time duration to the screen.

4. The multistable display as claimed in claim 3, wherein the pixel clearance header data comprises a pixel clearance positive voltage information and a pixel clearance negative voltage information;

wherein the pixel clearance positive voltage information comprises a first pixel clearance positive voltage value and a second pixel clearance positive voltage value, and the pixel clearance negative voltage information comprises a first pixel clearance negative voltage value and a second pixel clearance negative voltage value;

wherein the pixel clearance waveform data comprises a plurality of pixel electrode clearance information, and the plurality of pixel electrode clearance information at least comprises a first pixel electrode clearance information, and the first pixel electrode clearance information comprises a first clearance voltage duty number;

wherein the driver circuit stores a duty count, and the driver circuit calculates a first remaining clearance voltage duty number by subtracting the first clearance voltage duty number from the duty count;

wherein when the driver circuit determines the pixel clearance driving time duration, for outputting the pixel clearance driver signal with the pixel clearance voltage value, according to the pixel clearance waveform data;

the driver circuit configures a first clearance time duration according to the first clearance voltage duty number of the pixel clearance waveform data, and the driver circuit outputs the pixel clearance driver signal with the first pixel clearance positive voltage value to a first pixel electrode of the screen for the first clearance time duration;

the driver circuit configures a second clearance time duration according to the first remaining clearance voltage duty number, and the driver circuit outputs the pixel clearance driver signal with the second pixel clearance positive voltage value to the first pixel electrode for the second clearance time duration;

the driver circuit configures a third clearance time duration according to the first clearance voltage duty number, and the driver circuit outputs the pixel clearance driver signal with the first pixel clearance negative voltage value to the first pixel electrode for the third clearance time duration; and the driver circuit configures a fourth clearance time duration according to the first remaining clearance voltage duty number, and the driver circuit outputs the pixel clearance driver signal with the second pixel clearance negative voltage value to the first pixel electrode for the fourth clearance time duration.

5. The multistable display as claimed in claim 3, wherein the time controller circuit further comprises:

a digital to analog control port, connected to the driver circuit, and outputting a conversion control signal to the driver circuit, wherein the conversion control signal comprises a plurality of counting signals;

wherein the driver circuit stores a duty count;

wherein the pixel clearance header data comprises a pixel clearance positive voltage information and a pixel clearance negative voltage information;

wherein the pixel clearance positive voltage information comprises a first pixel clearance positive voltage value and a second pixel clearance positive voltage value, and the pixel clearance negative voltage information comprises a first pixel clearance negative voltage value and a second pixel clearance negative voltage value;

wherein the pixel clearance waveform data comprises a plurality of pixel electrode clearance information, the plurality pixel electrode clearance information at least comprises a first pixel electrode clearance information, and the first pixel electrode clearance information comprises a first clearance voltage duty number;

wherein when the driver circuit determines the pixel clearance driving time duration, for outputting the pixel clearance driver signal with the pixel clearance voltage value, according to the pixel clearance waveform data:

the driver circuit outputs the pixel clearance driver signal with the first pixel clearance positive voltage value to a first pixel electrode of the screen for a time when the driver circuit receives a $1^{st}$ counting signal to an $A^{th}$ counting signal outputted from the digital to analog control port;

the driver circuit outputs the pixel clearance driver signal with the second pixel clearance positive voltage value to the first pixel electrode for a time when the driver circuit receives an $(A+1)^{th}$ counting signal to a $B^{th}$ counting signal outputted from the digital to analog control port;

the driver circuit outputs the pixel clearance driver signal with the first pixel clearance negative voltage value to the first pixel electrode for a time when the driver circuit receives a $(B+1)^{th}$ counting signal to an $(A+B)^{th}$ counting signal outputted from the digital to analog control port; and the driver circuit outputs the pixel clearance driver signal with the second pixel clearance negative voltage value to the first pixel electrode for a time when the driver circuit receives an $(A+B+1)^{th}$ counting signal to a $(2B)^{th}$ counting signal outputted from the digital to analog control port; and wherein A is the first clearance voltage duty number, and B is the duty count.

6. The multistable display as claimed in claim 1, wherein the data signal further comprises a pixel clearance header data, a pixel clearance waveform data, a pixel ULH header data, and a pixel ULH waveform data;

wherein the driver circuit determines a pixel clearance voltage value for a pixel clearance driver signal according to the pixel clearance header data, the driver circuit determines a pixel clearance driving time duration for outputting the pixel clearance driver signal according to the pixel clearance waveform data, and the driver circuit outputs the pixel clearance driver signal with the pixel clearance voltage value for the pixel clearance driving time duration to the screen;

wherein the driver circuit determines a pixel ULH voltage value for a pixel ULH driver signal according to the pixel ULH header data, the driver circuit determines a pixel ULH driving time duration for outputting the pixel ULH driver signal according to the pixel ULH waveform data, and the driver circuit outputs the pixel ULH driver signal with the pixel ULH voltage value for the pixel ULH driving time duration to the screen.

7. The multistable display as claimed in claim 1, wherein the time controller circuit comprises:

a header setting control port, connected to the driver circuit, and outputting a header setting signal to the driver circuit; and at least one data signal output port, connected to the driver circuit, and outputting the data signal to the driver circuit;

wherein when the data signal outputted from the at least one data signal output port is the pixel static display header data, the data signal outputted from the at least one data signal output port is at a high voltage.

8. The multistable display as claimed in claim 1, wherein the pixel static display header data comprises a pixel display positive voltage information and a pixel display negative voltage information;

wherein the pixel display positive voltage information comprises a first pixel display positive voltage value and a second pixel display positive voltage value, and the pixel display negative voltage information comprises a first pixel display negative voltage value and a second pixel display negative voltage value;

wherein the pixel static display waveform data comprises a plurality of pixel electrode display information, and the plurality of pixel electrode display information at least comprises a first pixel electrode display information, and the first pixel electrode display information comprises a first display voltage duty number;

wherein the driver circuit stores a duty count, and the driver circuit calculates a first remaining display voltage duty number by subtracting the first display voltage duty number from the duty count;

wherein when the driver circuit determines the pixel display driving time duration, for outputting the pixel display driver signal with the pixel display voltage value, according to the pixel static display waveform data:

the driver circuit configures a first display time duration according to the first display voltage duty number of the pixel static display waveform data, and the driver circuit outputs the pixel display driver signal with the first pixel display positive voltage value to a first pixel electrode of the screen for the first display time duration;

the driver circuit configures a second display time duration according to the first remaining display voltage duty number, and the driver circuit outputs the pixel display driver signal with the second pixel display positive voltage value to the first pixel electrode for the second display time duration;

the driver circuit configures a third display time duration according to the first display voltage duty number of the pixel static display waveform data, and the driver circuit outputs the pixel display driver signal with the first pixel display negative voltage value to the first pixel electrode for the third display time duration; and the driver circuit configures a fourth display time duration according to the first remaining display voltage duty number, and the driver circuit outputs the pixel display driver signal with the second pixel display negative voltage value to the first pixel electrode for the fourth display time duration.

9. The multistable display as claimed in claim 1, wherein the time controller circuit further comprises:

a digital to analog control port, connected to the driver circuit, and outputting a conversion control signal to the driver circuit, wherein the conversion control signal comprises a plurality of counting signals;

wherein the driver circuit stores a duty count;

wherein the pixel static display header data comprises a pixel display positive voltage information and a pixel display negative voltage information;

wherein the pixel display positive voltage information comprises a first pixel display positive voltage value and a second pixel display positive voltage value, and the pixel display negative voltage information comprises a first pixel display negative voltage value and a second pixel display negative voltage value;

wherein the pixel static display waveform data comprises a plurality of pixel electrode display information, the plurality pixel electrode display information at least comprises a first pixel electrode display information, and the first pixel electrode display information comprises a first display voltage duty number;

wherein when the driver circuit determines the pixel display driving time duration, for outputting the pixel display driver signal with the pixel display voltage value, according to the pixel static display waveform data:

the driver circuit outputs the pixel display driver signal with the first pixel display positive voltage value to a first pixel electrode of the screen for a time when the driver circuit receives a $1^{st}$ counting signal to a $C^{th}$ counting signal outputted from the digital to analog control port;

the driver circuit outputs the pixel display driver signal with the second pixel display positive voltage value to the first pixel electrode for a time when the driver circuit receives a $(C+1)^{th}$ counting signal to a $B^{th}$ counting signal outputted from the digital to analog control port;

the driver circuit outputs the pixel display driver signal with the first pixel display negative voltage value to the first pixel electrode for a time when the driver circuit receives a $(B+1)^{th}$ counting signal to a $(B+C)^{th}$ counting signal outputted from the digital to analog control port; and the driver circuit outputs the pixel display driver signal with the second pixel display negative voltage value to the first pixel electrode for a time when the driver circuit receives a $(B+C+1)^{th}$ counting signal to a $(2B)^{th}$ counting signal outputted from the digital to analog control port; and wherein C is the first display voltage duty number, and B is the duty count.

10. The multistable display as claimed in claim 1, wherein the time controller signal comprises a scan signal, and the scan signal comprises a line static display header data and a line static display waveform data;

wherein before the driver circuit outputs a line driving signal to the screen, the driver circuit determines a line driving voltage value of the line driving signal according to the line static display header data, and the driver circuit also determines a waveform of the line driving signal according to the line driving voltage value and the line static display waveform data.

* * * * *